United States Patent
Fu et al.

(10) Patent No.: US 10,367,671 B2
(45) Date of Patent: Jul. 30, 2019

(54) TIME DOMAIN TRANSMITTER SIGNAL SHAPING

(71) Applicant: AVAGO TECHNOLOGIES INTERNATIONAL SALES PTE. LIMITED

(72) Inventors: Dengwei Fu, Sunnyvale, CA (US); Colin Fraser, Sunnyvale, CA (US); Amir Eliaz, Tel Aviv (IL); Daniel Stopler, Tel Aviv (IL); Sandeep Shenoy, Sunnyvale, CA (US)

(73) Assignee: AVAGO TECHNOLOGIES INTERNATIONAL, Singapore (SG)

( * ) Notice: Subject to any disclaimer, the term of this patent is extended or adjusted under 35 U.S.C. 154(b) by 0 days.

(21) Appl. No.: 15/824,146

(22) Filed: Nov. 28, 2017

(65) Prior Publication Data

US 2019/0165981 A1    May 30, 2019

(51) Int. Cl.
*H04L 27/26* (2006.01)
*H04B 1/04* (2006.01)

(52) U.S. Cl.
CPC ........... *H04L 27/2628* (2013.01); *H04B 1/04* (2013.01); *H04B 2001/0408* (2013.01)

(58) Field of Classification Search
CPC ............... H04L 27/2628; H04B 1/04; H04B 2001/0408
See application file for complete search history.

(56) References Cited

U.S. PATENT DOCUMENTS

| | | | | |
|---|---|---|---|---|
| 5,948,052 A * | 9/1999 | Toler | ...................... | H04S 1/007 375/296 |
| 9,246,523 B1 * | 1/2016 | Stopler | ................ | H04B 1/0458 |
| 9,762,350 B2 * | 9/2017 | Stopler | ................ | H04B 1/0458 |
| 2004/0161053 A1 * | 8/2004 | Cavers | .................. | H03F 1/3229 375/297 |
| 2010/0157910 A1 * | 6/2010 | Nentwig | ............... | H04L 5/0007 370/329 |
| 2013/0195221 A1 * | 8/2013 | Lozhkin | ............... | H04B 1/0475 375/297 |
| 2014/0161005 A1 * | 6/2014 | Laurent-Michel | ..... | H04B 1/525 370/281 |

* cited by examiner

*Primary Examiner* — Freshteh N Aghdam
(74) *Attorney, Agent, or Firm* — Xsensus LLP

(57) ABSTRACT

High peak-to-average ratio of OFDM signals requires large back-off from an RF power amplifier's saturation power. A spectral shaper device therefore increases the output power and efficiency of the power amplifier. The shaper device performs linearization through digital predistortion, based on an out-of-band regrowth limit, as well as the EVM requirement for a particular data rate. The shaper can distribute the error energy, precisely, over frequencies such that each of the inband and out-of-band requirements is independently and individually met. The shaper distributes error energy to frequency regions in the spectrum to the maximally allowed by the standards and regulations, while not increasing the total error. The error energy is kept to the minimum where it is crucial in meeting EVM requirements. In this way, the shaper maximizes the allowable output power of the nonlinear power amplifier.

19 Claims, 25 Drawing Sheets

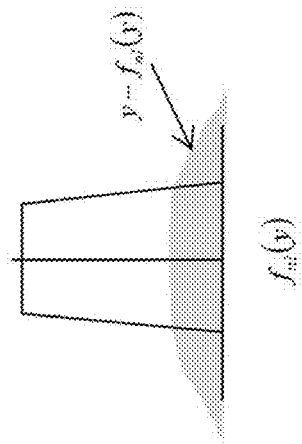
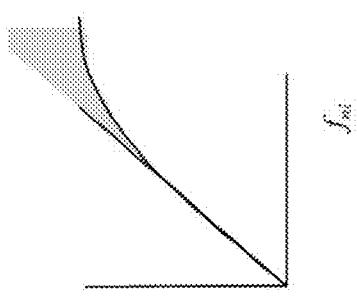
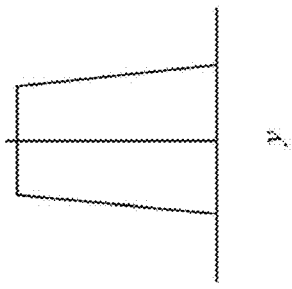
FIG. 2C
FIG. 2B
FIG. 2A

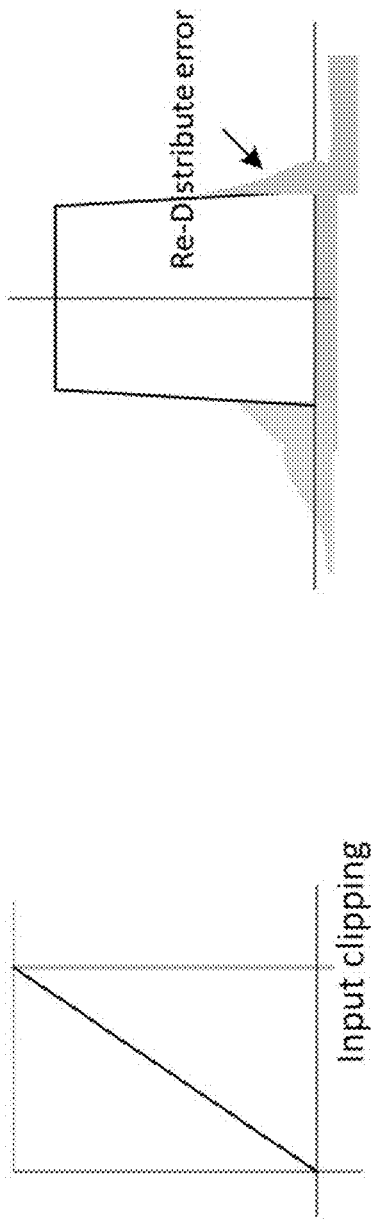
FIG. 5A
FIG. 5C
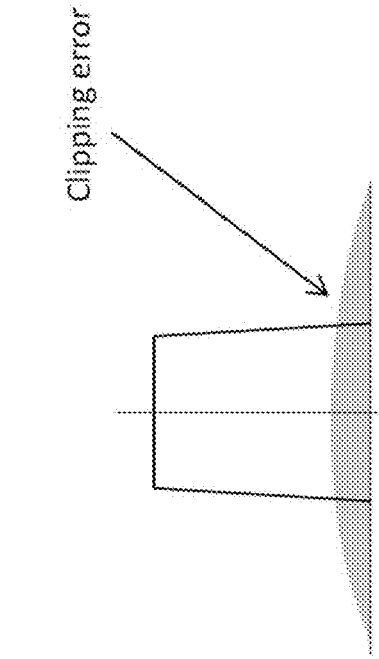
FIG. 5B
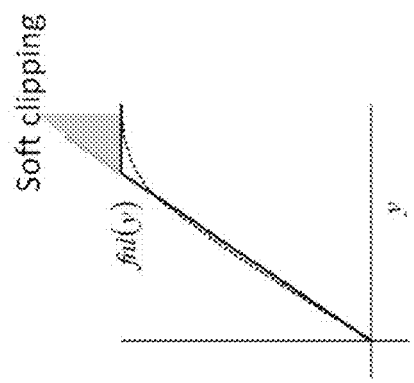
FIG. 5D

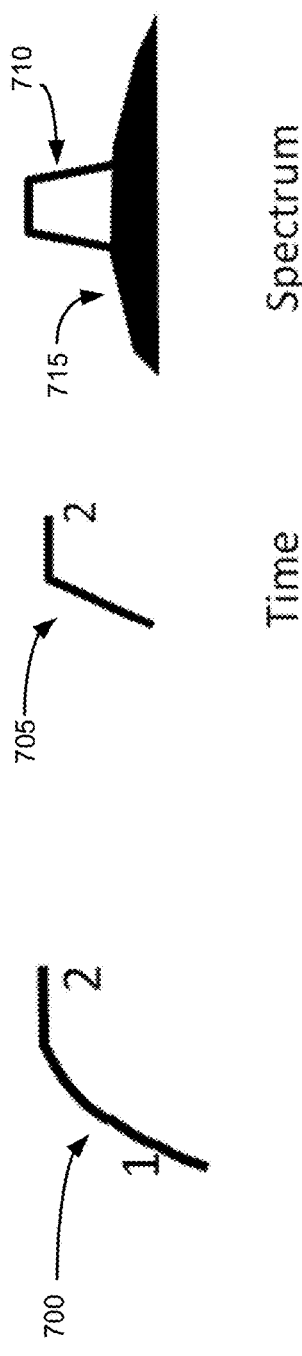
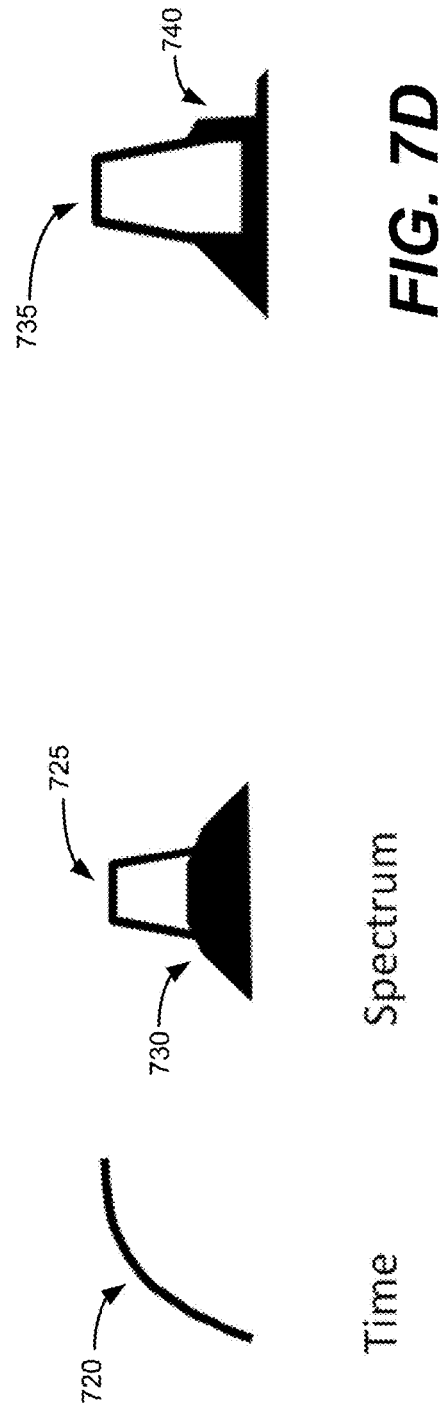
FIG. 7A
FIG. 7B
FIG. 7C
FIG. 7D

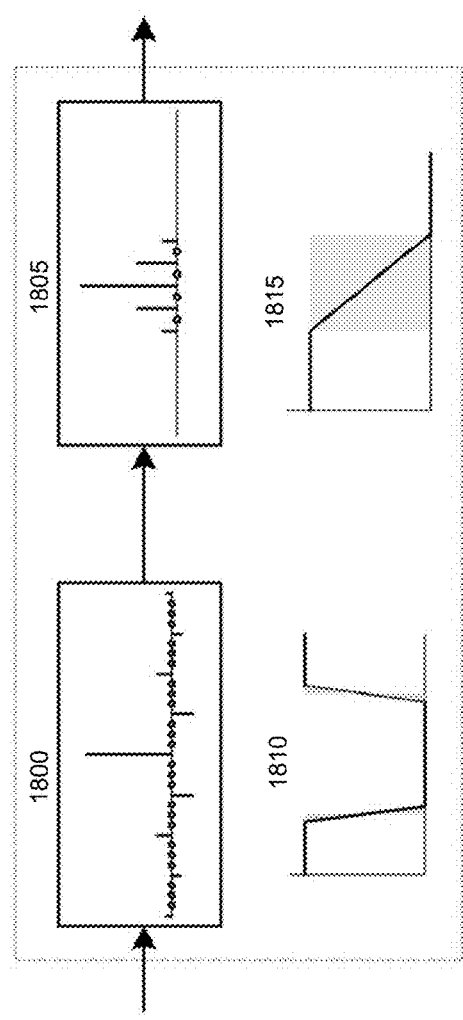
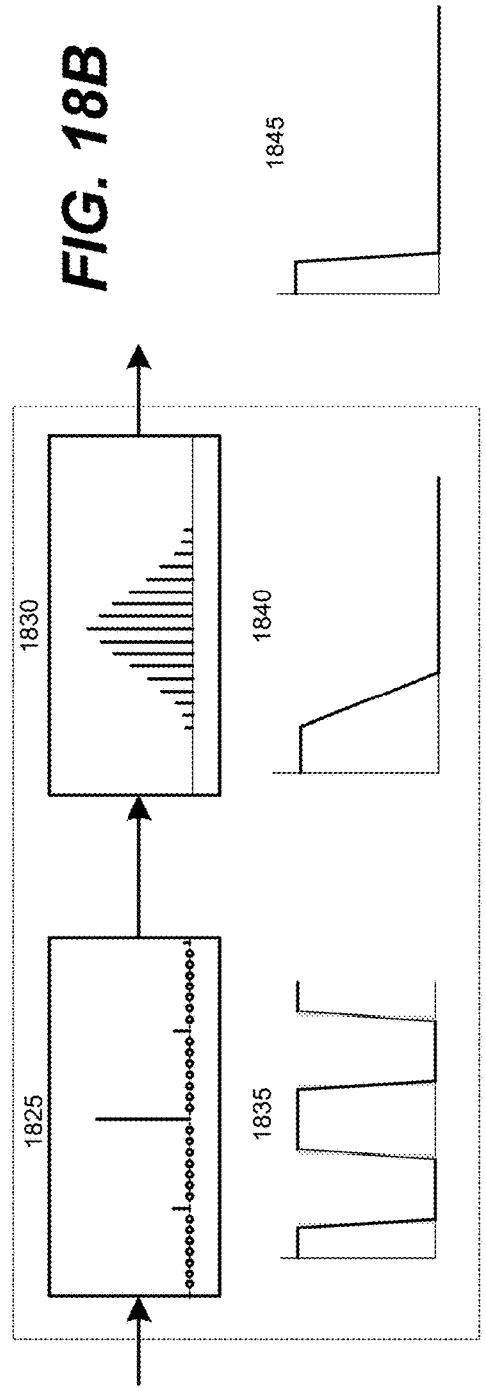

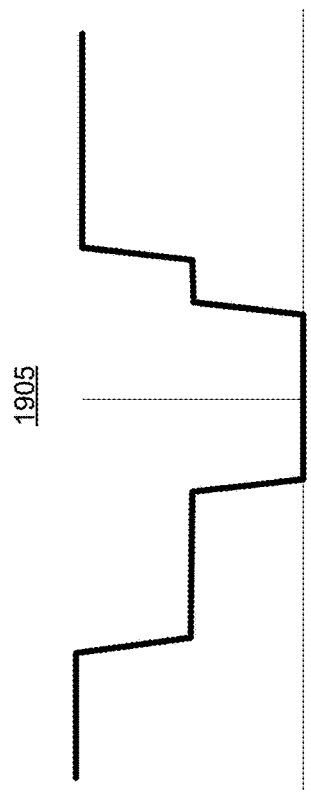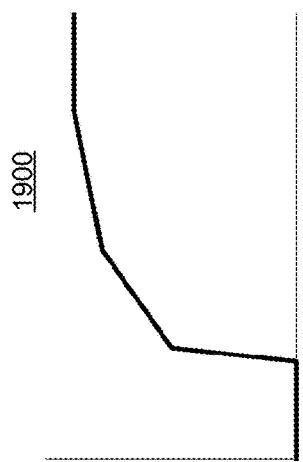
FIG. 19

TIME DOMAIN TRANSMITTER SIGNAL SHAPING

BACKGROUND

Field

The present disclosure is directed to an apparatus and associated methodology for shaping a transmitter frequency spectrum, and more specifically, for shaping a frequency spectrum of one or more amplifiers of the transmitter.

Description of the Related Art

Modulated signals, for example those modulated via orthogonal frequency division multiplexing (OFDM), are very band-efficient, but may have high peak-to-average power and therefore lack power efficiency. Large back-offs from a power amplifier's saturation voltage is also needed to retain good signal quality and limit distortion. Typically, the quality of these signals is measured with an out-of-band emission spectrum mask and an in-band error (EVM).

When the power of a power amplifier is increased, signal errors grow across the frequency spectrum of the output signal due to distortions by the power amplifier. This causes EVM degradation due to the growth of the spectrum errors inside the signal's designated bandwidth. In addition, out-of-band emissions can occur due to the growth of the spectrum errors outside of the signal's designated bandwidth. Without spectral shaping, the PSD of the signal may violate the out-of-band emission spectrum mask at a few frequencies and be within mask limits in all other frequencies, and/or the power spectral density (PSD) of the signal may not violate the out-of-band emission spectrum mask at all, but may violate EVM requirements. Thus, without spectral shaping, the uncontrolled errors in the frequency spectrum of a signal limits the achievable output power of a power amplifier, and hence the transmitter, particularly since the out-of-band emission spectrum mask and EVM requirements are set by, for example, the FCC and wireless standards and must be adhered to.

Conventional methods for spectral shaping attempt to do so using iterative frequency domain techniques which may cause symbol boundary effects that degrade performance and may require numerous iterations to properly shape a signal's frequency spectrum. Moreover, such frequency domain techniques are only applicable to OFDM modulation. Other techniques may use a combination of iterative polar clipping and filtering, but these techniques cannot independently adjust for out-of-band emissions and in-band EVM. Therefore, a need exists for spectral shaping of signals that allows independent out-of-band emission and in-band EVM adjustments while limiting complexity and the number of iterations needed to complete the shaping.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is a graph of a modulated signal according to exemplary aspects of the present disclosure;

FIG. 2B is a graph of an input/output characteristic of a power amplifier according to exemplary aspects of the present disclosure;

FIG. 2C is a graph of a spectrum of the output of the power amplifier based on input of the modulated signal according to exemplary aspects of the present disclosure;

FIG. 5A is a graph of input clipping according to exemplary aspects of the present disclosure;

FIG. 5B is a graph of re-distribution of spectrum errors according to exemplary aspects of the present disclosure;

FIG. 5C is a graph of soft-clipping according to exemplary aspects of the present disclosure;

FIG. 5D is a graph of clipping error according to exemplary aspects of the present disclosure;

FIG. 7A is an input/output characteristic of a power amplifier according to exemplary aspects of the present disclosure;

FIG. 7B is an input/output characteristic and frequency spectrum of a power amplifier after digital pre-distorting according to exemplary aspects of the present disclosure;

FIG. 7C is an input/output characteristic and frequency spectrum of a power amplifier after initial shaping according to exemplary aspects of the present disclosure;

FIG. 7D is a frequency spectrum of a power amplifier after band-edge filtering and in-band noise cancellation according to exemplary aspects of the present disclosure;

FIG. 18A is a filter kernel according to exemplary aspects of the present disclosure;

FIG. 18B is another filter kernel according to exemplary aspects of the present disclosure;

FIG. 19 are characteristics of arbitrary filters according to exemplary aspects of the present disclosure;

DETAILED DESCRIPTION

Figure 1:
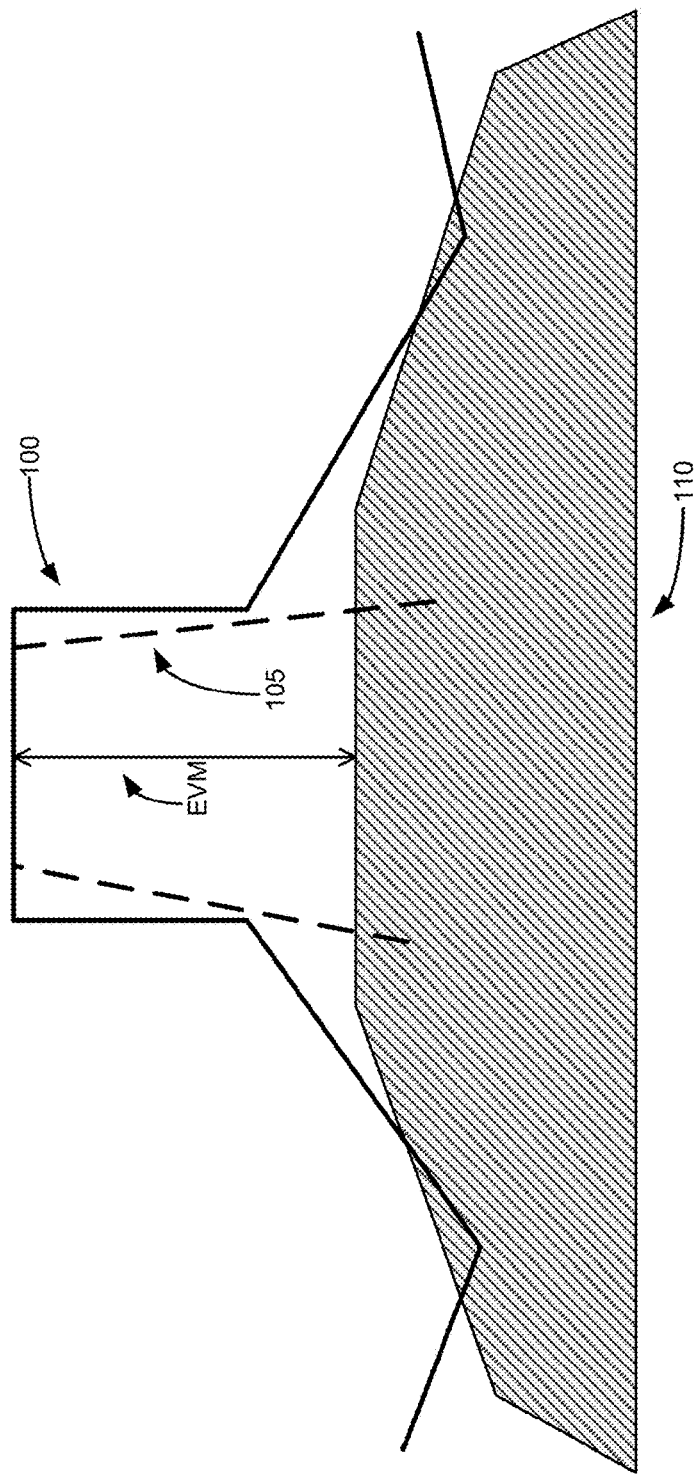
FIG. 1 is a frequency domain diagram of a power amplifier output overlaid with an out-of-band emission spectrum mask and EVM requirements according to exemplary aspects of the present disclosure.

Referring now to the drawings, wherein like reference numerals designate identical or corresponding parts throughout the several views, FIG. 1 is a diagram of the frequency spectrum 110 of a transmitter output signal according to aspects of the present disclosure. The spectrum 110 of the transmitter output signal is measured against an out-of-band emission mask 100 to determine whether there are any violations of the mask. As can be seen from FIG. 1, the mask 100 is violated in two locations which indicate a need for spectrum shaping. An acceptable EVM mask 105 is also overlaid on the spectrum 110 of the transmitter output signal to determine whether in-band EVM meets requirements or not. For the sake of brevity, the inventive features of this disclosure are described with reference to OFDM modulation. However, these features are equally applicable to any other modulation scheme as one of ordinary skill would recognize.

FIG. 2A is a spectrum of a band-limited signal y which is to be amplified by a power amplifier. The characteristic of the power amplifier $f_{n1}$ is illustrated in FIG. 2B. As can be seen from FIG. 2B, the power amplifier's characteristic has a nonlinear but monotonically rising region followed by a saturation region. Both regions cause spectral errors as can be seen in FIG. 2C. In FIG. 2C, the output of the power amplifier $f_{n1}(y)$ includes the signal, and an error characteristic $y-f_{n1}(y)$ which causes EVM degradation and mask violations.

Figure 3A:
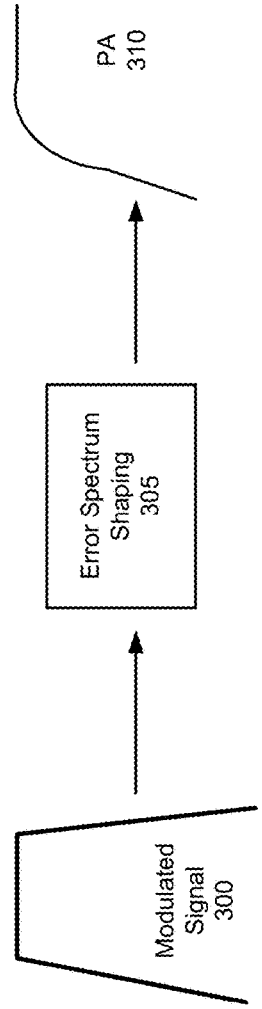
FIG. 3A is a diagram of spectral shaping according to exemplary aspects of the present disclosure.

FIG. 3A is a block diagram of spectral shaping of the output of a power amplifier according to exemplary aspects of the present disclosure. As can be appreciated a transmitter may include one or more power amplifiers to increase a transmit power of the output signal of the transmitter to required levels. Such power amplifiers may significantly affect the out-of-band emissions and in-band EVM of the output signal, particularly as the operating point of the power amplifier approaches the amplifier's saturation level. FIG. 2A illustrates a modulated signal 300 that is provided to a spectral shaper 305 which shapes the signal 300 to compensate for the nonlinearities in the power amplifier 310, as will be described below in detail. The result of the shaping by the spectrum shaper 305 can be seen in FIG. 3B where the spectrum 325 of the output signal has been shaped to fall within the out-of-band emission mask 315. Additional shaping of the spectrum 325 may be performed by the spectral shaper 305 to further reduce high frequency emissions below a specified requirement 320, at either or both high and low frequency edges of the band. The EVM characteristic is also improved to meet requirements 330.

Figure 4A:
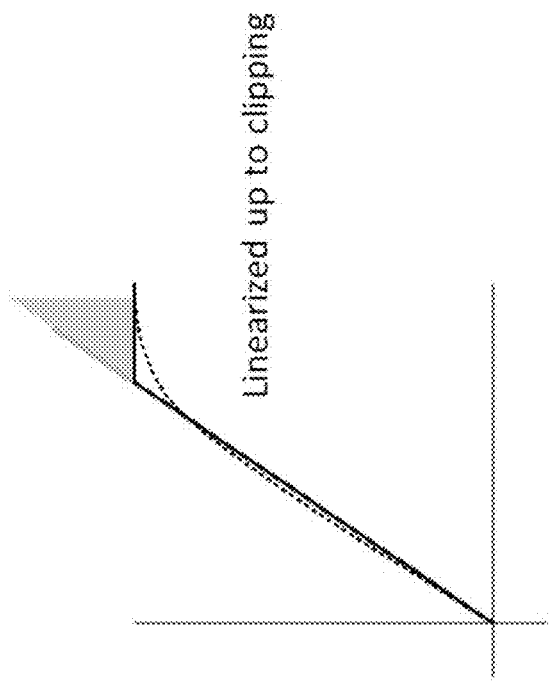
FIG. 4A is an input/output characteristic of a power amplifier with linearization and clipping according to exemplary aspects of the present disclosure.
Figure 4B:
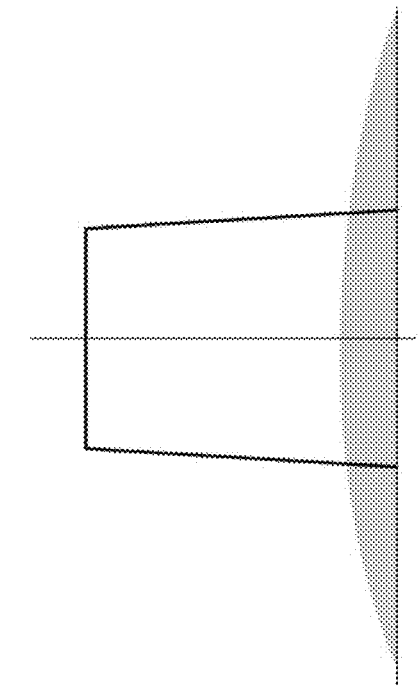
FIG. 4B is a graph of the spectrum of the output of the power amplifier after linearization and clipping according to exemplary aspects of the present disclosure.

Next, an overview of spectral shaping according to exemplary aspects of the present disclosure is provided with reference to FIGS. 4A-4B and FIGS. 5A-5D. FIG. 4A is a more detailed graph of the input/output characteristics of a power amplifier. As discussed above, the input/output characteristic of the power amplifier includes a non-linear monotonically increasing region and a saturation region. As can be seen in FIG. 4 the spectral shaper linearizes the non-linear monotonically increasing region up to clipping, which is performed at the saturation threshold of the power amplifier by polar clipping as is described in detail below. The result of the linearization and polar clipping is illustrated in FIG. 4B in which the spectral emissions of the power amplifier is lowered.

FIG. 5C depicts the linearization of the monotonically increasing section of the power amplifier, transforming the distortion errors to clipping errors, with the clipping error spectrum illustrated in FIG. 5D. FIG. 5A is a graph displaying the results of the linearization and clipping of the input signal. The errors in the signal are then redistributed as illustrated in FIG. 5B in order to meet requirements, such as the out-of-band emissions mask 100, as well as EVM 105, of FIG. 1.

Figure 6:
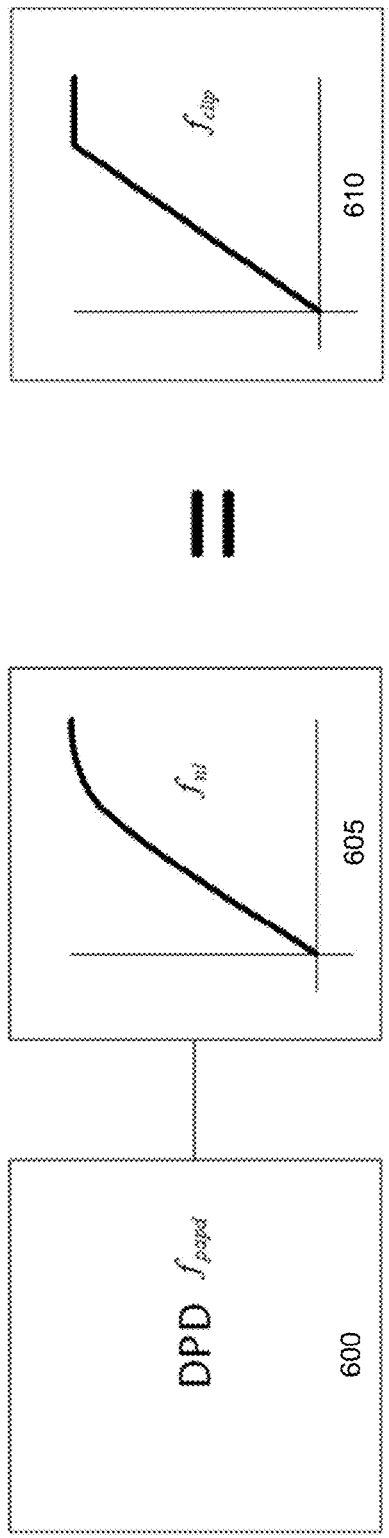
FIG. 6 is a block diagram of the mapping of the power amplifier input/output characteristic after digital pre-distortion to a clipped version of the power amplifier input/output characteristics according to exemplary aspects of the present disclosure.

The results of the shaping illustrated in FIGS. 5A-5B, which are primarily intended to meet requirements, are then adjusted, as shown in FIGS. 5C-5D, for the nonlinearity in the power amplifier. As illustrated in FIG. 6, the result of the shaping to meet requirements is provided to a digital pre-distorter (DPD) 600 that compensates for the nonlinearity in the power amplifier 605. For example, the DPD 600 may have an inverse input/output characteristic to that of the power amplifier 605. The signal that is processed by the DPD 600 is provided to the power amplifier 605 and the output 610 of the power amplifier 605 is substantially linear up to the saturation point of the power amplifier 605.

FIGS. 7A-7D are other illustrations of spectral shaping according to exemplary aspects of the present disclosure. The input/output characteristic 700 of a power amplifier is illustrated in FIG. 7A. As discussed above, the input/output characteristic of the power amplifier includes a non-linear monotonically increasing region 1 and a saturated region 2. FIG. 7B illustrates the input/output characteristic 705 of the power amplifier after linearization and clipping to the saturation region 2 of the power amplifier. FIG. 7B also illustrates the band-limited signal 710 and the spectral emissions 715 generated by the errors in the amplifier. FIG. 7C shows the characteristic of the nonlinear mapping 720 after further shaping to limit spectral emissions 730 in the signal 725. The signal 735 is then adjusted to meet EVM and other spectral requirements 740. In this way, the signal input to a power amplifier can be independently adjusted to meet in-band and out-of-band requirement as well as to account for nonlinearity in the power amplifier.

Figure 8:
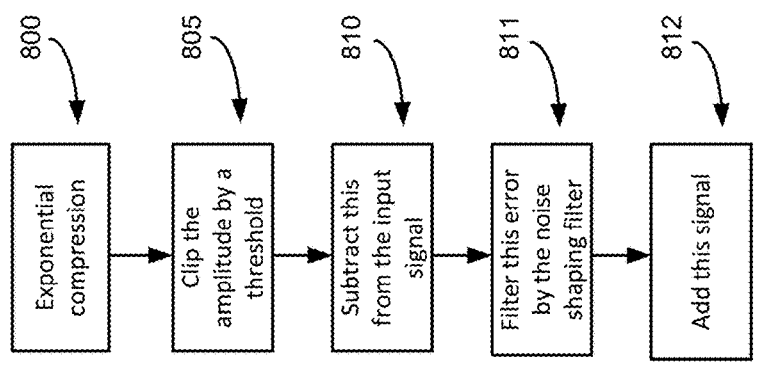
FIG. 8 is an algorithmic flowchart of spectral shaping according to exemplary aspects of the present disclosure.

FIG. 8 is an algorithmic flowchart of a spectral shaping process according to exemplary aspects of the present disclosure. As can be appreciated, the method described with respect to FIG. 8 may be performed by a general purpose processor by executing a series of computer-readable instructions, or by one or more dedicated hardware circuits. Though FIG. 8 is illustrated as a series of sequential steps, one of ordinary skill in the art would recognize that some of the steps may be performed in parallel, and that the steps may be ordered differently than the illustrated order. Therefore, FIG. 8 is merely exemplary and not limiting upon the present disclosure. The exponential compression 800 is one such function of nonlinear mapping.

The process in FIG. 8 begins at step 800 where the input signal is nonlinearly mapped through, for example, exponential compression in order to meet a given requirement, such as the out-of-band emissions mask 100 of FIG. 1. At step 805, the signal is clipped at, for example, the saturation point of the power amplifier, and the result is subtracted from the input signal at step 810 in order to isolate in-band errors. These in-band errors are filtered with a noise shaping filter (which is described below), and the result is added to the clipped signal of step 805 in order to obtain a signal that has been shaped to meet in-band and out-of-band requirements. Though not illustrated in FIG. 8, this signal may be further processed with a digital pre-distorter, as discussed above, in order to compensate for amplifier nonlinearity.

As discussed above, the non-linear mapping performed in step 800 of FIG. 8 is performed to meet out-of-band emissions requirements. The function for this mapping may be determined offline empirically from a mask of the requirements using, for example, an iterative training algorithm as one of ordinary skill would recognize. As such, the nonlinear mapping may be performed using a look-up table, polynomial, combination of fundamental mathematical functions, or any other method without departing from the scope of the present disclosure.

Figure 9:
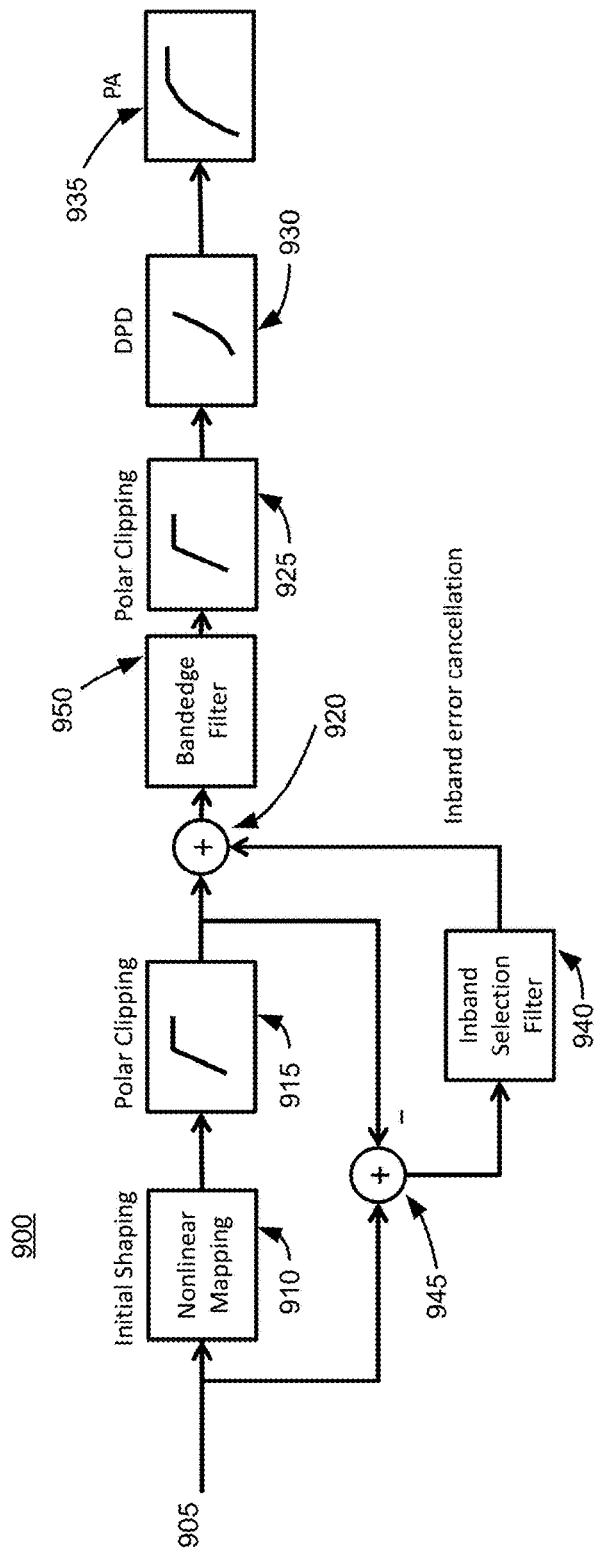
FIG. 9 is a block diagram of a spectral shaper according to exemplary aspects of the present disclosure.

Next, a spectrum shaper 900 according to exemplary aspects of the present disclosure is described with reference to FIG. 9. In FIG. 9, the input signal to the spectral shaper 900 is provided at input 905 where it is input into a nonlinear mapper 910 that performs initial spectral shaping. As discussed above, the nonlinear mapper 910 adjusts out-of-band spectral emissions in order to satisfy a predetermined requirement (i.e., mask). The output of the nonlinear mapper 910 is provided to a polar clipper 915 that clips the signal to a saturation level of the power amplifier 935 to which the signal will ultimately be provided. The polar clipper is a clipper that hard-limits the amplitude of complex signals while preserving the phase. The output of the polar clipper 915 is provided to a summing node 945 where it is subtracted from the signal received at the input 905. The output of the summing node 945 is the spectral error across the entire frequency range multiplied by negative one, and is provided to an in-band selection filter 940 which isolates the in-band error in the signal. The output of the in-band selection filter 940 is provided to another summing node 920 which adds it to the output of the polar clipper 915.

As can be appreciated the in-band selection filter may be implemented as a digital filter (IIR, FIR, wave-digital or lattice), analog filter, switched capacitor filter, etc., and may be band-pass, low-pass, high-pass, notch, or combination thereof. Thus, the particular in-band selection filter 940 used is not limiting upon the present disclosure.

Figure 3B:
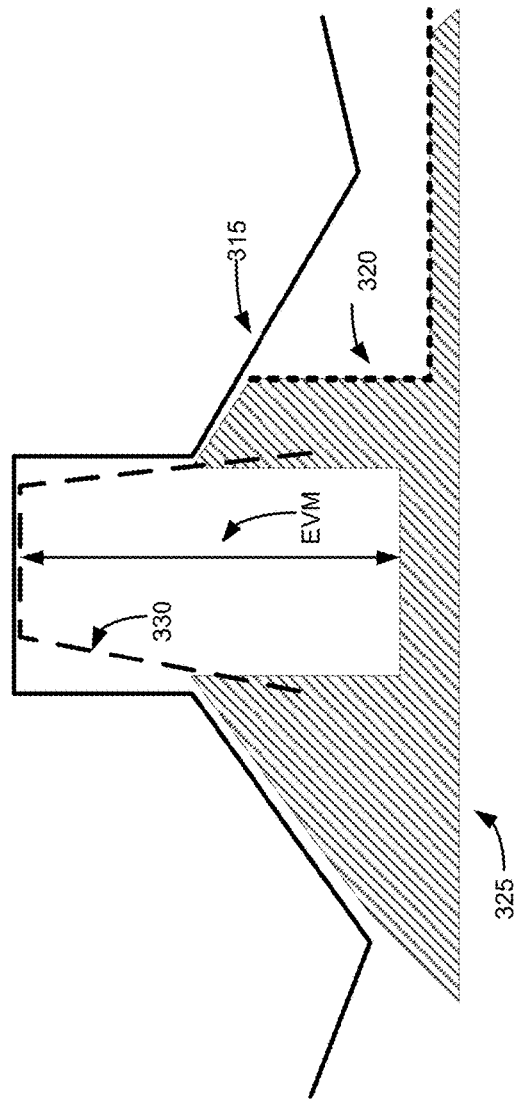
FIG. 3B is a frequency domain diagram of a power amplifier output after spectral shaping according to exemplary aspects of the present disclosure.

Returning to FIG. 9, the output of the summing node 920 is provide to a band-edge filter 950 that further attenuates out-of-band emissions at the edges of the band as illustrated at, for example, reference number 320 of FIG. 3B. As can be appreciated the band-edge filter 950 may attenuate emissions at the high-frequency edge of the band, the low frequency edge of the band, or both. The band-edge filter may also be a digital filter (FIR, IIR, wave-digital or lattice), adaptive filter, analog filter, switched-capacitor filter, and the like. Thus, the specific implementation of the band-edge filter 950 in no way limits the present disclosure.

The output of the band-edge filter is provided to another polar clipper 925 that clips the signal at the saturation point of the power amplifier 935. In some exemplary aspects, the polar clipper 920 (and 915) may clip the signal at a level that is lower than the saturation point of the power amplifier 935.

The clipped signal is then provided to a DPD circuit 930 that pre-distorts the signal to account for nonlinearity in the power amplifier 935. As discussed above, the DPD circuit 930 may implement an input/output characteristic that is the inverse of the nonlinear monotonically increasing region of the power amplifier's input output characteristic. However, the DPD circuit 935 may implement other input/output characteristics as one of ordinary skill would recognize. The output of the DPD circuit 935 is provided to the power amplifier 935 for amplification and transmission.

Figure 10:
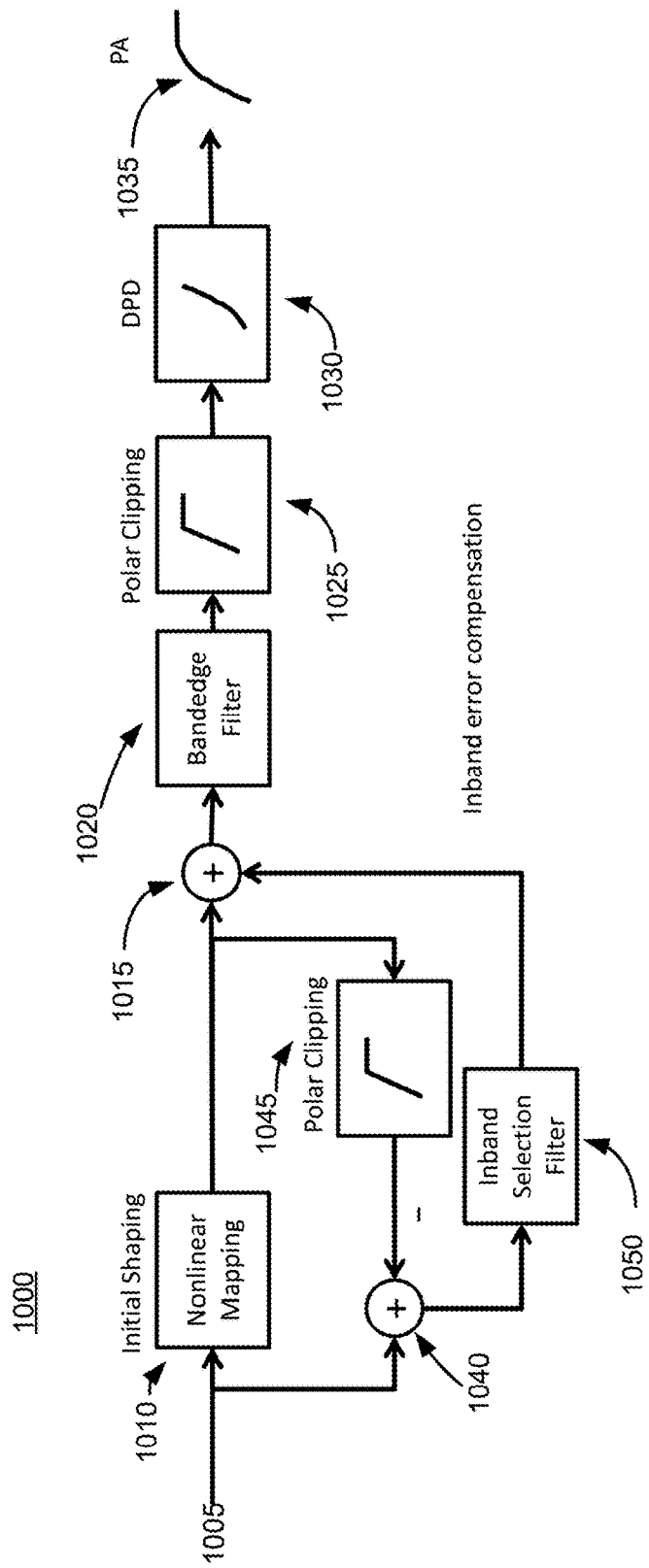
FIG. 10 is a block diagram of another spectral shaper according to exemplary aspects of the present disclosure.

FIG. 10 is another spectral shaper according to exemplary aspects of the present disclosure. In FIG. 10, a signal is provided to a nonlinear mapper 1010 via the input 1005. As explained above, the nonlinear mapper 1010 performs an initial shaping of the signal in order to meet out-of-band requirements (i.e., mask). The output of the nonlinear mapper is provided to a polar clipper 1045 that clips the signal to the saturation point of the power amplifier 1035 (or to a lower level). The output of the polar clipper 1045 is provided to a summing node 1040 that subtracts this output from the signal received at the input 1005. The output of the summing node 1040 is then provided to an in-band selection filter 1050, which as described above, isolates the in-band error. The output of the in-band selection filter 1050 is provided to another summing node 1015 where it is added to the output of the nonlinear mapper 1010. Then the output of the summing node 1015 is provided to a band-edge filter 1020 that further attenuates emissions at the edges of the band as discussed above. The output of the band-edge filter 1020 is provided to another polar clipper 1025 which clips the signal to the saturation point of the power amplifier 1035 (or below it), and the result is provided to a DPD circuit 1030 in order to compensate for power amplifier nonlinearity as described above. The result is provided to the power amplifier 1035 for amplification and transmission. Thus, the spectral shaper 1000 differs from the spectral shaper 900 in that the polar clipper 1045 is provide in a feedback path rather than the main signal path.

Figure 11:
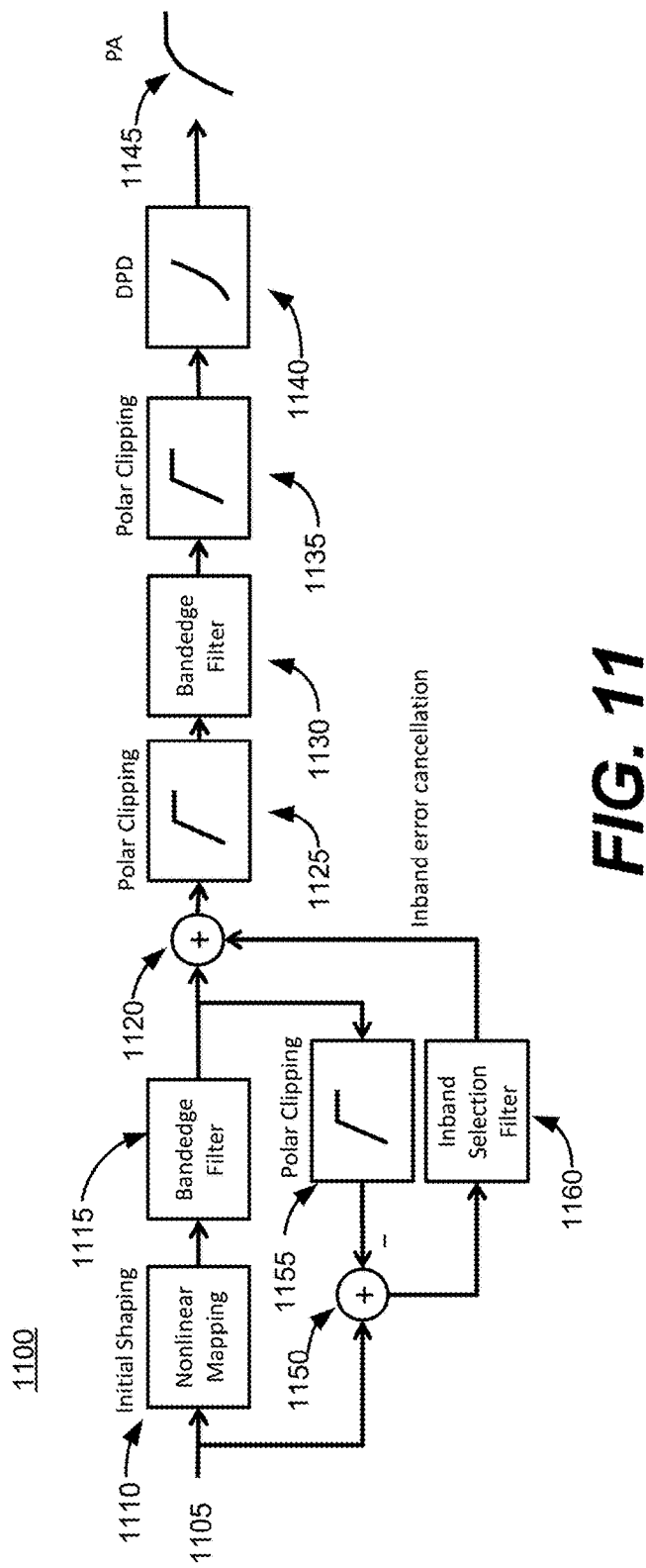
FIG. 11 is a further diagram of a spectral shaper according to exemplary aspects of the present disclosure.

FIG. 11 is another spectral shaper 1100 according to exemplary aspects of the disclosure. As can be seen from this figure, the spectral shaper 1100 differs from the spectral shaper 1000 in that additional band-edge filter 1115 and polar clipper 1125 are added to the main signal path. Thus, a signal inputted to the nonlinear mapper 1110 via the input 1105 is initially shaped by the nonlinear mapper 1110 as discussed above, and then provided to the band-edge filter 1115 for further attenuation of spectral emissions as the edges of the band, also as described above. The output of the band-edge filter 1115 is provided to a polar clipper 1155 for clipping at the saturation point of the power amplifier 1145 before being provided to the summing node 1150. The summing node 1150 subtracts this signal from the signal received at input 1105, and provides the difference to an in-band selection filter 1160 for isolation of the in-band errors as discussed above. The output of the in-band selection filter 1160 is provided to another summing node that adds it to the output of the band-edge filter 1115, and then provides the result to another polar clipper 1125 for clipping at, or below, the saturation point of the power amplifier 1145. Another band-edge filter 1130 then filters the output of the polar clipper 1125 to further attenuate spectral emissions at the edges of the band. The output of the band-edge filter 1130 is clipped at, or below, the saturation point of the power amplifier 1145 by another polar clipper 1135 before being provided to a DPD circuit 1140 which compensates for nonlinearity in the power amplifier 1145 as described above. The result is provided to the power amplifier 1145 for amplification and transmission.

In FIG. 11, the band-edge filters 1115 and 1130 may have a same frequency response or may have different frequency responses in order to, for example, attenuate emission at both high and low frequency edges of the band, or to deepen the level of attenuation at one or both edges by having the responses of both band-edge filters 1115 and 1130 overlap. As can be appreciated one or both of the band-edge filters 1115 and 1120 may also be omitted depending on application.

Figure 12:
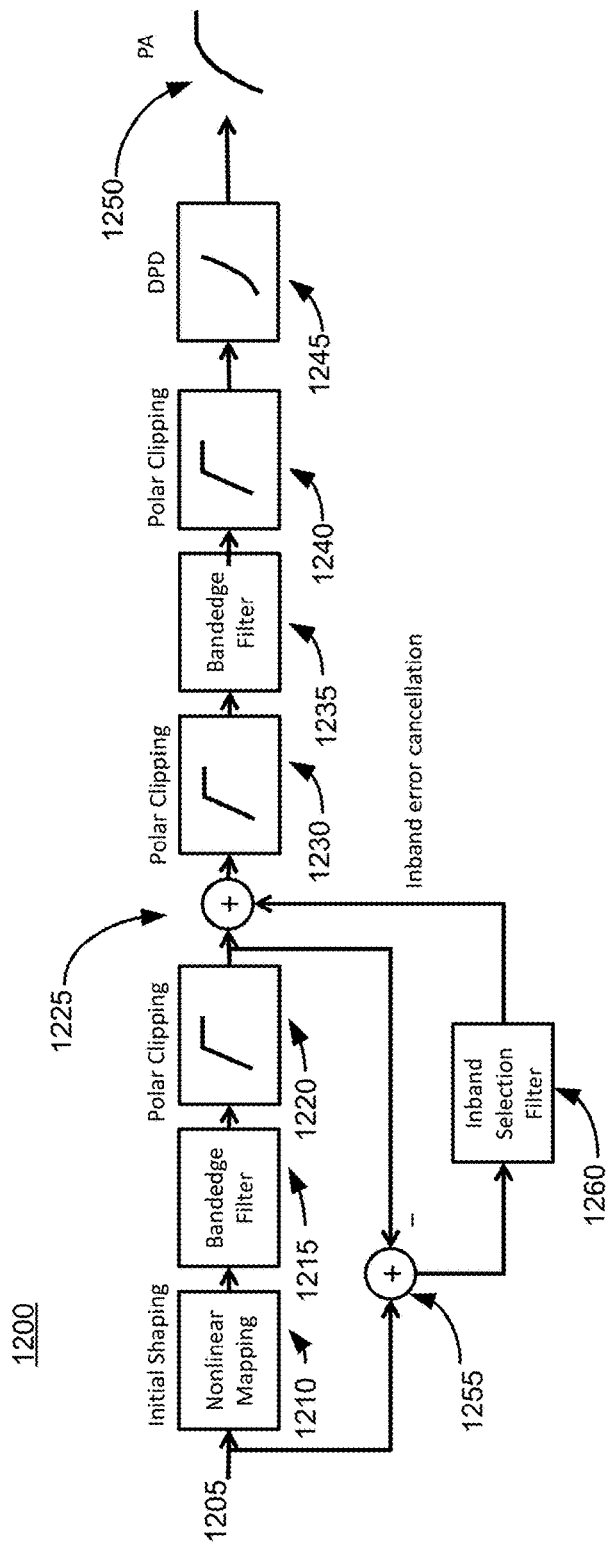
FIG. 12 is another diagram of a spectral shaper according to exemplary aspects of the present disclosure.

FIG. 12 is another spectral shaper 1200 according to exemplary aspects of the present disclosure. In comparison with the spectral shaper 1100 of FIG. 11, FIG. 12 differs in that the polar clipper 1220 is arranged in the main signal path instead of in the feedback path. Therefore, specific description of the functions of each block is omitted for brevity since these functions are described above. Accordingly, the signal received at input 1205 is shaped, filtered and clipped by the nonlinear mapper 1210, band-edge filter 1215, and polar clipper 1220, respectively. The output of the polar clipper 1120 is provide to the summing node 1255 for subtraction from the signal input at the input 1205, and the result is filtered by the in-band selection filter 1260 and provide to the summing node 1225. The output of the summing node 1225 is then clipped by the polar clipper 1230, filtered by the band-edge filter 1235, clipped by the polar clipper 1240, and compensated by the DPD circuit 1245. The result is then provided to the power amplifier 1250 for amplification and transmission as discussed above.

Figure 13:
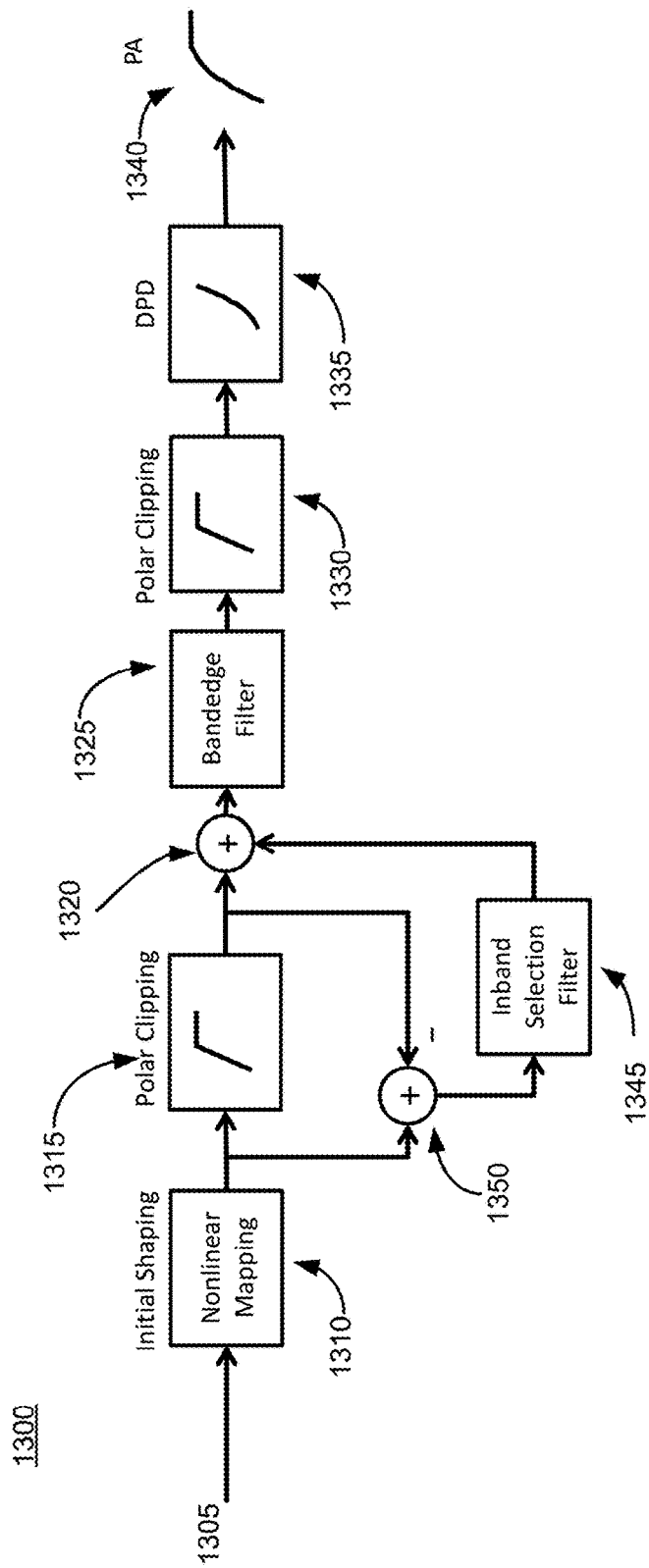
FIG. 13 is a further diagram of a spectral shaper according to exemplary aspects of the present disclosure.

FIG. 13 is a further spectral shaper 1300 according to exemplary aspects of the present disclosure. In comparison with the shaper of 900 in FIG. 9, FIG. 13 differs in that, at the summing node 1350, the output of polar clipper 1315 is subtracted from the output of the nonlinear mapper 1310, instead of the signal received at the input 1305. This structure supports receivers equipped with distortion recovery (DRR). While the topology of the spectral shaper 1300 differs from the spectral shapers of FIGS. 9-12, each individual block illustrated in FIG. 13 performs substantially the same function as the corresponding blocks in FIGS. 9-12. Therefore, further description of the functionality of the individual blocks is omitted for the sake of brevity.

In FIG. 13, the signal received at the input 1305 is shaped by the nonlinear mapper 1310 and clipped by the polar clipper 1315. The result is then subtracted from the output of the nonlinear mapper 1310 by the summing node 1350. The output of the summing node 1350 is filtered by the in-band selection filter 1345 and added to the output of the polar clipper 1315 by the summing node 1320. The output of the summing node 1320 is then filtered by the band-edge filter 1325, clipped by the polar clipper 1330, and compensated by the DPD circuit 1335 before being provided to the power amplifier 1340.

The above descriptions of the spectral shapers in FIGS. 9-13 focus on the functionality of the spectrum shapers. However, one of ordinary skill will recognize that the above-described spectrum shapers, and each of their components, may be implements as hardware circuits on one or more of field programmable gate arrays (FPGA's), complex logic devices (CPLD's), digital signal processors, microcontrollers, and/or micro-processors. Implementation may also be in the form of discrete analog and logic circuits, or may be in the form of an application-specific integrated circuit (ASIC) or system on a chip (SoIC). Of course, the implementations may also include ancillary circuits such as digital-to-analog converter circuits, analog-to-digital converter circuits, clock generation circuitry, power supply circuitry, and circuit protection circuits. Other implementations are also possible without departing from the scope of the present disclosure.

Moreover, individual blocks in the spectral shapers of FIGS. 9-10 may be omitted, such as one or more of the band-edge filters, and one or more of the polar clippers. Other blocks, such as the nonlinear mappers may be replaced with DPD circuits. Thus, the spectral shapers described with reference to FIGS. 9-13 are merely exemplary, and other spectral shapers are possible without departing from the scope of the present disclosure, as one of ordinary skill would recognize.

Figure 14:
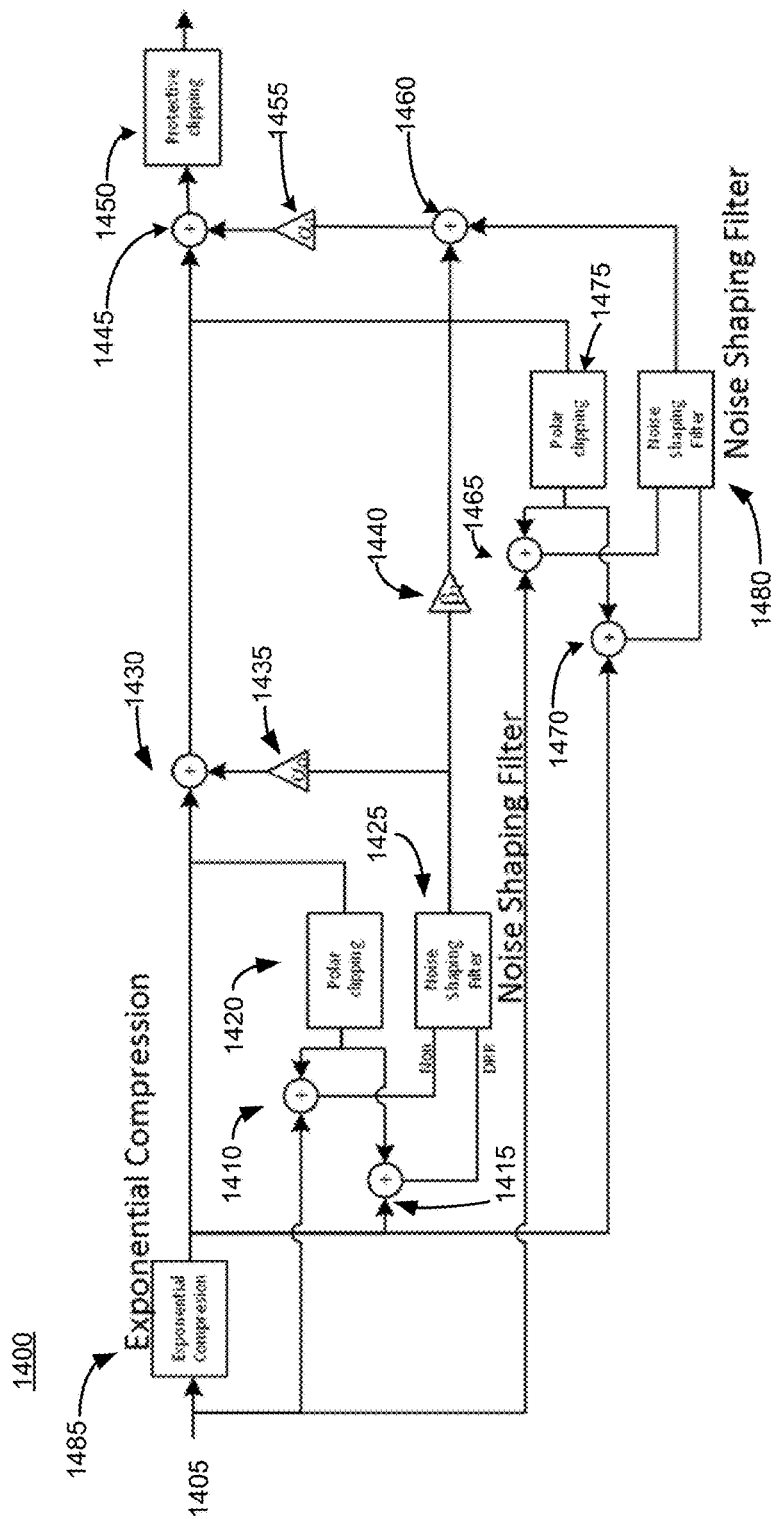
FIG. 14 is a diagram of a two-iteration spectral shaper according to exemplary aspects of the present disclosure.

The spectral shapers in FIGS. 9-12 are single iteration shapers. However, the spectral shaper 1400 of FIG. 14 is a two-iteration spectral shaper according to exemplary aspects of the present disclosure. In FIG. 14, a signal is initially shaped by a nonlinear mapping function, such as an exponential compressor 1485, which will be described in detail below. The output of the exponential compressor 1485 is provide to a polar clipper 1420 which clips the signal at, for example, the saturation point of the power amplifier (not shown). The output of the polar clipper 1420 is added to the signal received at the input 1405, and the result is provide to a noise shaping filter 1425, which is described below. The output of the polar clipper 1420 is also added to the output of the exponential compressor 1485 by the summing node 1415, and the result is also provided to the noise shaping filter 1425. The noise shaping filter 1425 chooses the output of the summing node 1415 if the receiver is capable of non-linear distortion recovery (for instance using a distortion recovery receiver (DRR)), or output of the summing node 1410 for all other receivers. The output of the noise shaping filter 1425 is provided to another summing node 1430 via a programmable gain circuit 1435 where it is added to the output of the exponential compressor 1485. The output of the summing node 1430 is provide to another polar clipper 1475 which clips the output of the signal at, for example, the saturation point of the power amplifier (not shown), and then provides the clipped signal to a summing node 1465 where it is added to the signal received at the input 1405. The output of the polar clipper 1475 is also provided to another summing node 1470 where it is added to the output of the exponential compressor 1485. The outputs of both summing nodes 1465 and 1470 are provided to another noise shaping filter 1480 that filters the signal and provides it to the summing node 1460. The noise shaping filter 1480, similarly, chooses the input based on whether the receiver is DRR-enabled. The output of the noise shaping filter 1425 is also provided to the summing node 1460 via a gain circuit 1440. The summing node 1460 adds the outputs of the two noise shaping filters 1425 and 1480 and provides the result to a further summing node 1445 via a gain circuit 1455. The summing node 1445 then adds this signal to the output of the exponential compressor 1485, and the result is clipped by the protective clipper 1450 at, for example, the saturation point of the power amplifier.

In FIG. 14, the polar clipper 1420, noise filter 1425, and summing nodes 1410 and 1415 represent one iteration cell, and the polar clipper 1475, the noise shaping filter 1480, and the summing nodes 1465 and 1470 represent a second iteration cell. The two iterations cells are combined by the summing nodes 1430 and 1445, and by the gain circuits 1435, 1440, and 1455. As can be appreciated, the concepts of FIG. 14 may be extended to any number of iterations by replicating the iteration cells, such as the two iteration cells in FIG. 14. Furthermore, the noise shaping filters 1425 and 1480 may have the same response or may have different filter responses depending on application. The polar clippers 1420 may also clip at the same level or at different levels, and the protective clipper 1450 may also be a polar clipper or a Cartesian clipper. Therefore, FIG. 14 is merely exemplary, and any number of iterations may be used without departing from the scope of the present advancements.

Also, the spectral shaper 1400 illustrated in FIG. 14 may be implemented in an FPGA, CPLD, ASIC, or using discrete electronic components. The spectral shaper 1400 may also be implemented as a set of computer-readable instructions executing on a general purposed processor, microcontroller, digital signal processor, and the like. Numerous other implementations are also possible without departing from the scope of the present disclosure.

Figure 15:
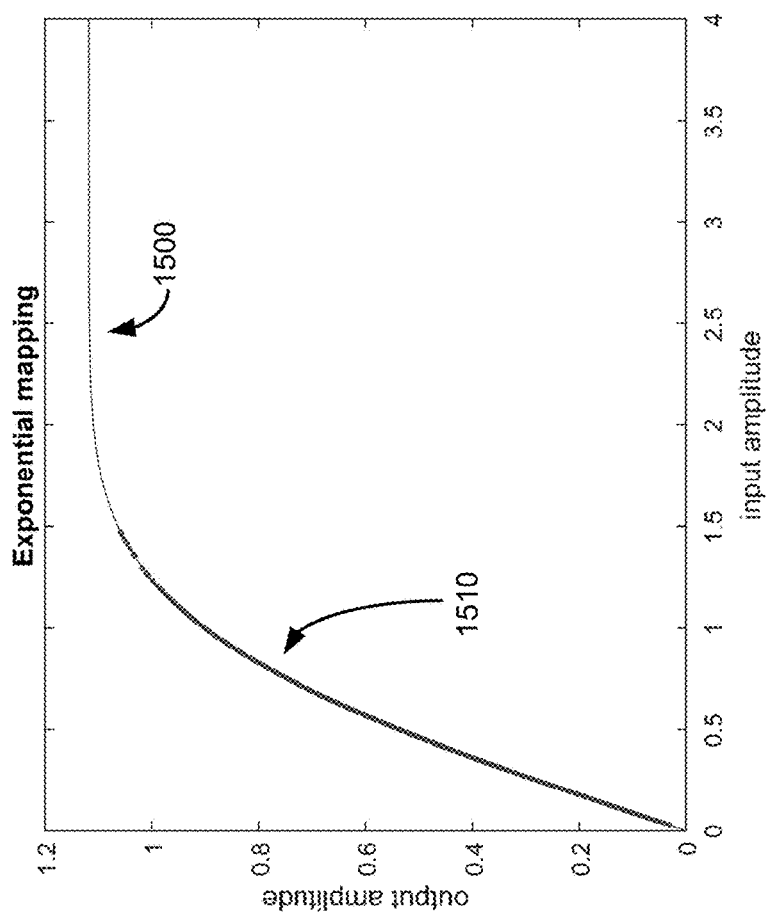
FIG. 15 is a graph of exponential mapping or exponential compression according to exemplary aspects of the present disclosure.

Next, the exponential compressor 1485 is described with reference to FIG. 15. As can be seen from this figure, the exponential compressor implements an input/output characteristic that has two main regions. The first region 1510 is a monotonically rising region, albeit non-linear, in which the output of the exponential compressor 1485 rises as the input to the exponential compressor 1485 rises. In the second region 1500 the output of the exponential compressor levels off and remains at a predetermined level even with increasing input levels. Thus, the exponential compressor's input/output characteristic is logarithmic. Therefore, the exponential compressor 1485 may be implemented as a logarithmic function executing on, for example, one of the circuits described above, or may be implemented as a look-up table. Other implementations are also possible as one of ordinary skill would recognize.

Next, the noise shaping filters 1425 and 1480 are described with reference to FIG. 16. The noise shaping filter of FIG. 16 includes a filter bank 1630 that is connected to oscillators 1620 and 1625. The oscillators 1620 and 1625 are controlled by WcA 1610 and WcB 1615 which set the oscillation frequencies of the oscillators 1620 and 1625. A selector 1605 is also connected to the filter bank to determine which of the two inputs DRR or NonDRR will be used by the noise shaping filter 1600. The inputs DRR and NonDRR are connected to the two summing nodes of an iteration cell. For example, in FIG. 14, the DRR of the noise shaping filter 1425 is connected to the summing node 1415, and the NonDRR of the noise shaping filter 1425 is connected to the summing node 1410. The DRR input is used when the receiver is able to perform transmitter nonlinear distortion recovery. Otherwise, the NonDRR input is used.

Figure 16:
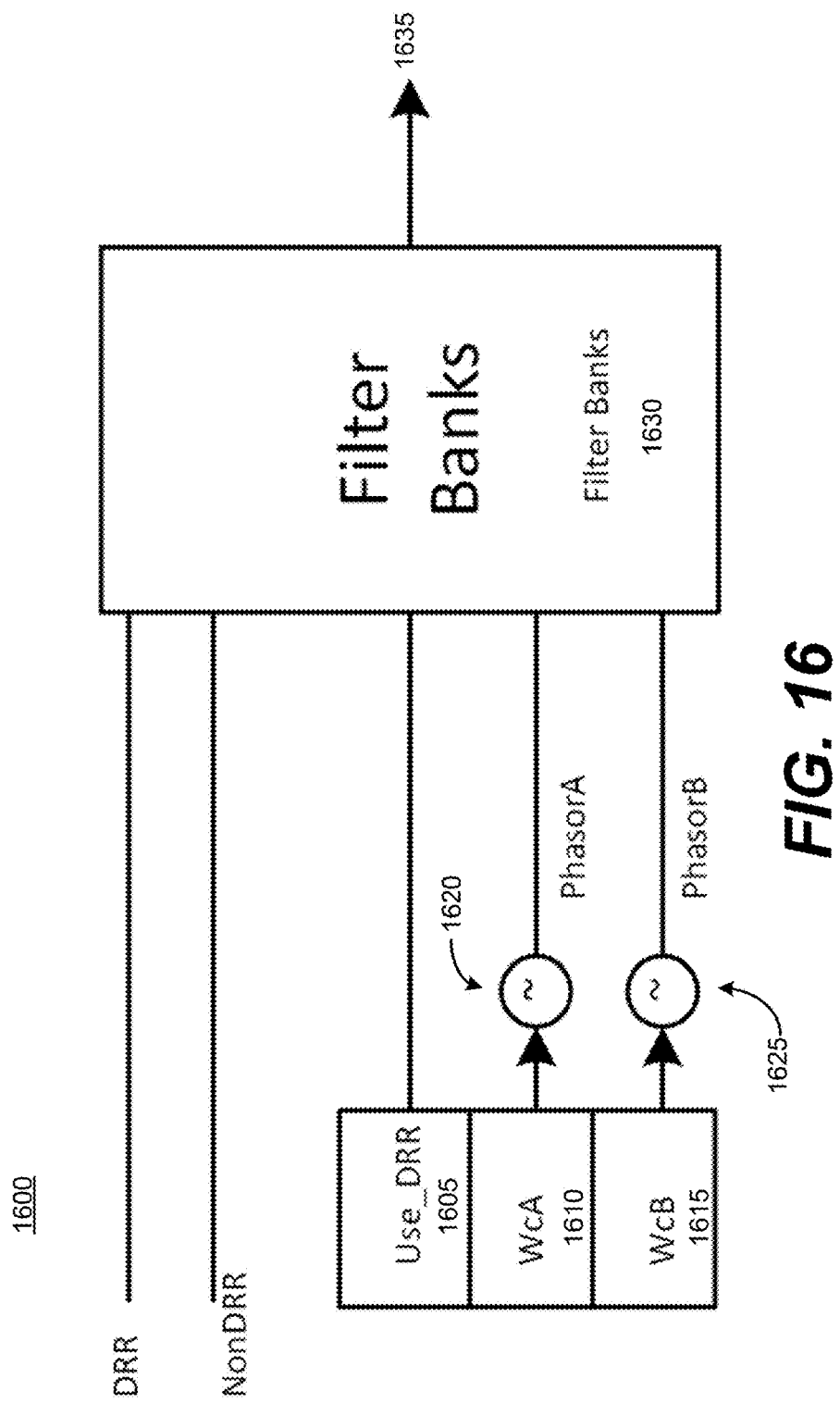
FIG. 16 is a block diagram of a noise shaping filter according to exemplary aspects of the present disclosure.

Thus, in FIG. 16 the input to the filter bank 1630 is filtered by the filter bank 1630 using the oscillators 1620 and 1625 in order to generate the output of the noise shaping filter 1600. The details of the filter bank 1630 are described below with reference to FIG. 17.

Figure 17:
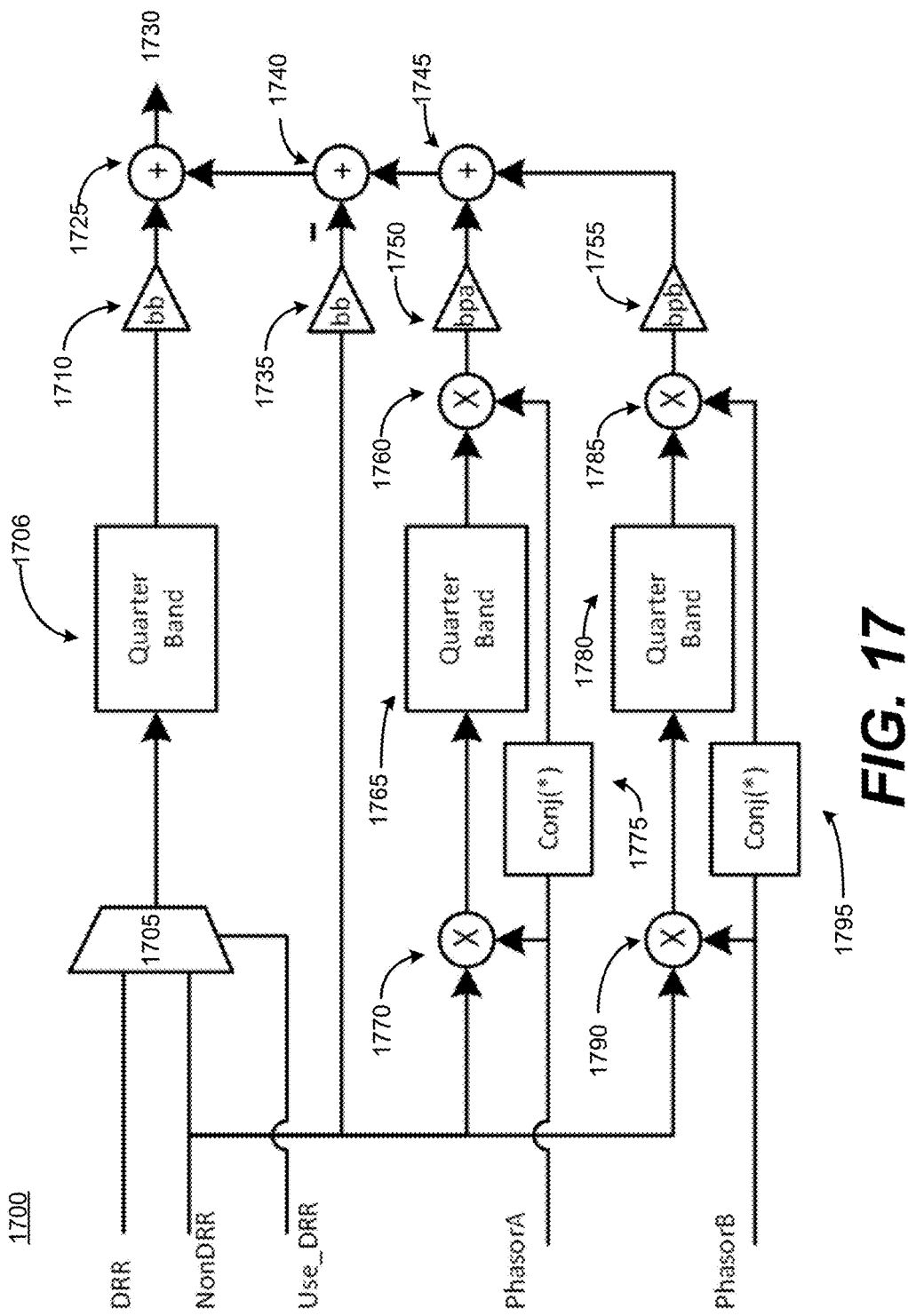
FIG. 17 is a block diagram of a filter bank according to exemplary aspects of the present disclosure.

The filter bank 1700 of FIG. 17 includes a multiplexer 1705 that selects between the DRR and NonDRR input based on a signal received on the Use DRR line. The output of the multiplexer is provided to a quarter band filter 1706, and the output of the quarter band filter 1706 is provided to a summing node 1725 via a gain circuit 1710. The NonDRR input is provided to a summing node 1740 via a gain circuit 1735. The NonDRR input is also provided to mixers 1770 and 1790 which respectively mix the NonDRR input with phasor A (from oscillator 1620 of FIG. 16) and phasor B (from oscillator 1625 of FIG. 16). The outputs of the mixers 1770 and 1790 are respectively provided to quarter band filters 1765, 1780, and the outputs of the quarter band filters 1765, 1780 are respectively provided to mixers 1760, 1785. These mixers 1760, 1785 respectively mix the outputs of the quarter band filters 1765, 1780 with the complex conjugates 1775, 1795 of the phasors A and B. The output of the mixers 1760, 1785 are provided to the summing node 1745 via gain circuits 1750 and 1755, respectively. The summing node 1745 adds the two signals together and provides the result to summing node 1740 where a scaled NonDRR is subtracted from it. The NonDRR is scaled by the gain circuit 1735, for example. The output of the summing node 1740 is added to the scaled output of the quarter band filter 1706 by summing node 1725 to generate the output 1730 of the filter bank 1700.

The filter bank 1700 is described as having quarter band filters with response, such as those illustrated in FIG. 18A. For example, each quarter band filter may include a band-stop characteristic 1810 having the response 1800 in series with a low-pass characteristic 1815 having the response 1805. However, the filter bank 1700 may also use eighth band filters including a double-band-stop characteristic 1835 having the response 1825 in series with a low-pass characteristic 1840 having the response 1830 as illustrated in FIG. 18B. Thus, the filter structure illustrated in FIG. 17 is merely exemplary and other structures are possible without departing from the scope of the present disclosure.

Figure 20:
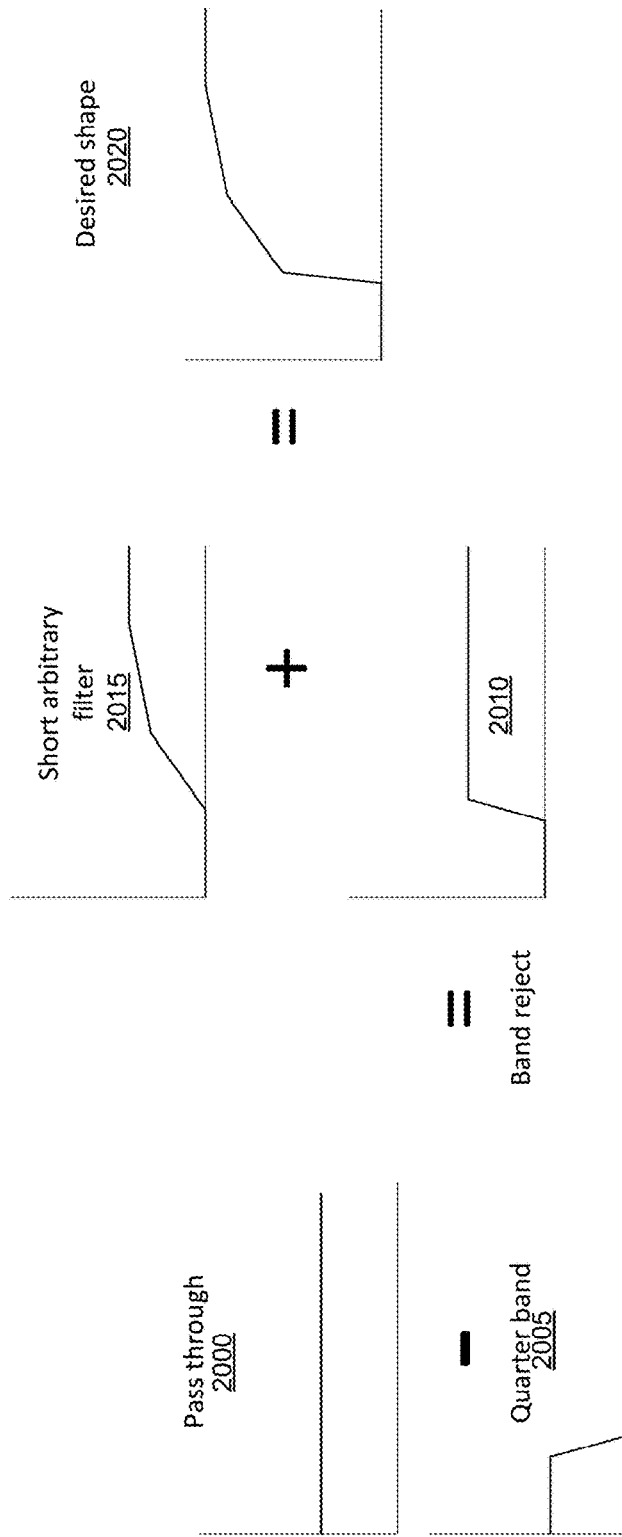
FIG. 20 is an example of combining characteristics of arbitrary filters in order to obtain a desired filter response.

The noise shaping filters of FIG. 14 may also be prototype, or arbitrary filters, that are short in length in order to limit implementation cost. The response of such a filter 1900 is illustrated in FIG. 19. Because this filter is short, it cannot implement sharp edges for band selection or band rejection. However, arbitrary shapes 1905 with sharp edges may be created by combining low-cost arbitrary filters. In one example illustrated in FIG. 20, a quarter band filter 2005 is subtracted from a pass-through filter 200 to generate a band-reject response 2010. The band-reject response 2010 is added to a short arbitrary filter 2015 in order to arrive at the desired characteristic 2020.

Figure 21:
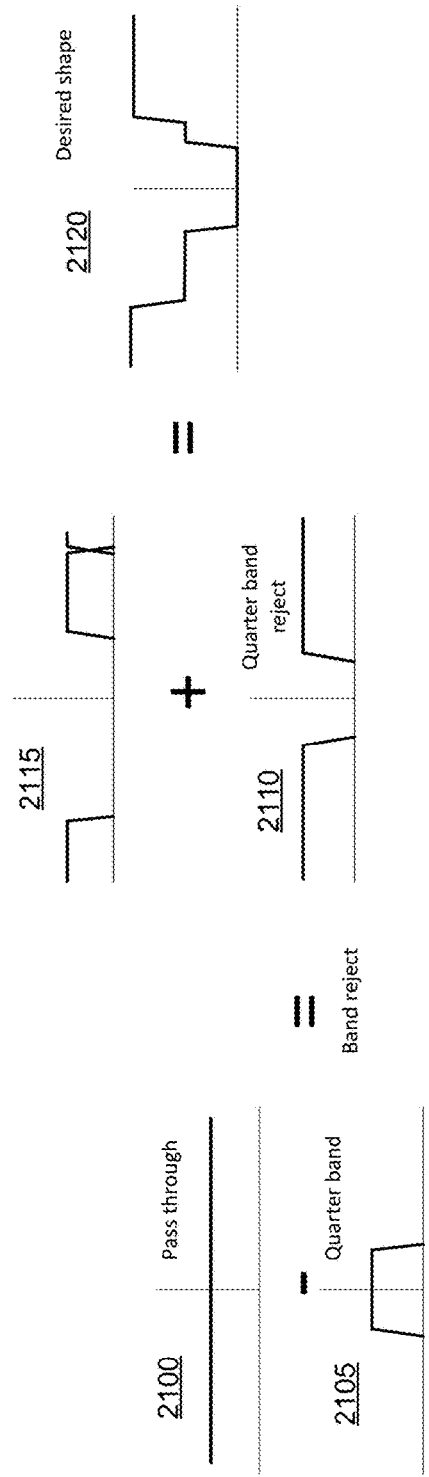
FIG. 21 is another example of combining characteristics of arbitrary filters in order to obtain a desired filter response.
Figure 22:
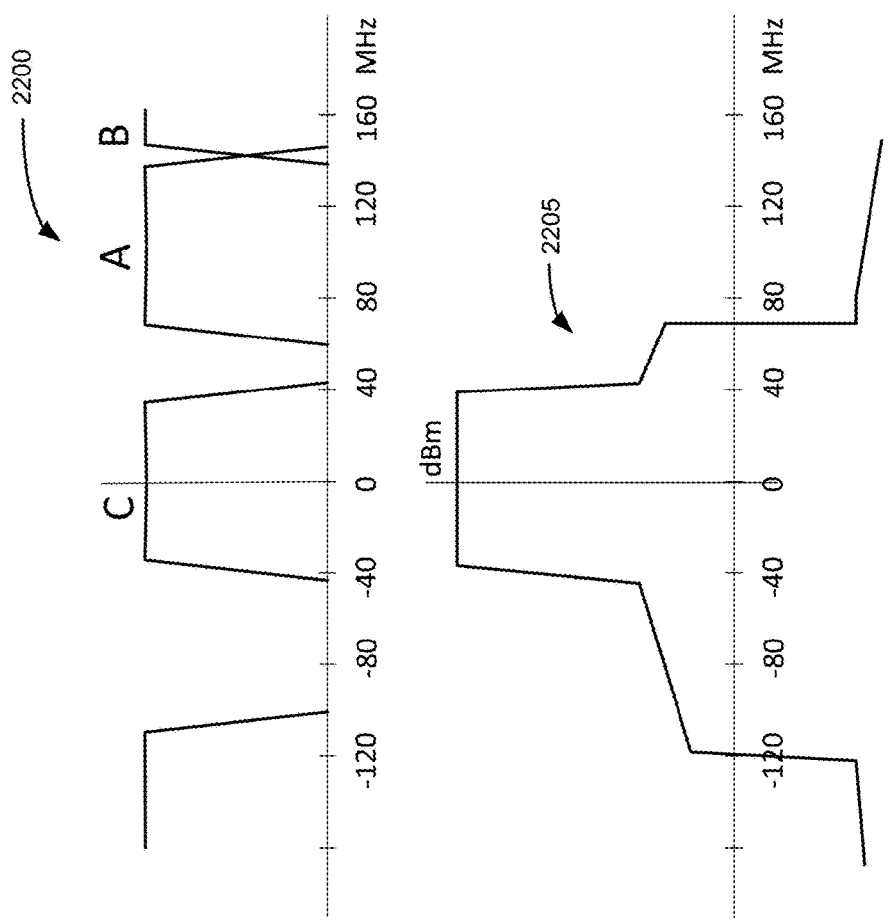
FIG. 22 is a further example of combining characteristics of arbitrary filters in order to obtain a desired filter response.

In another example illustrated in FIG. 21, a quarter band filter 2105 is subtracted from a pass-through filter 2100 to generate a quarter-band-reject characteristic 2110. The quarter-band-reject characteristic 2110 is added to a band-pass characteristic 2115 to arrive at the desired arbitrary filter characteristic 2120. In a third example, multiple band-pass characteristic filters B, B, C in 2200 are combined to generate the desired filter characteristic 2205 as illustrated in FIG. 22. Numerous other variations are also possible as would be recognized by one skilled in the art.

Figure 23:
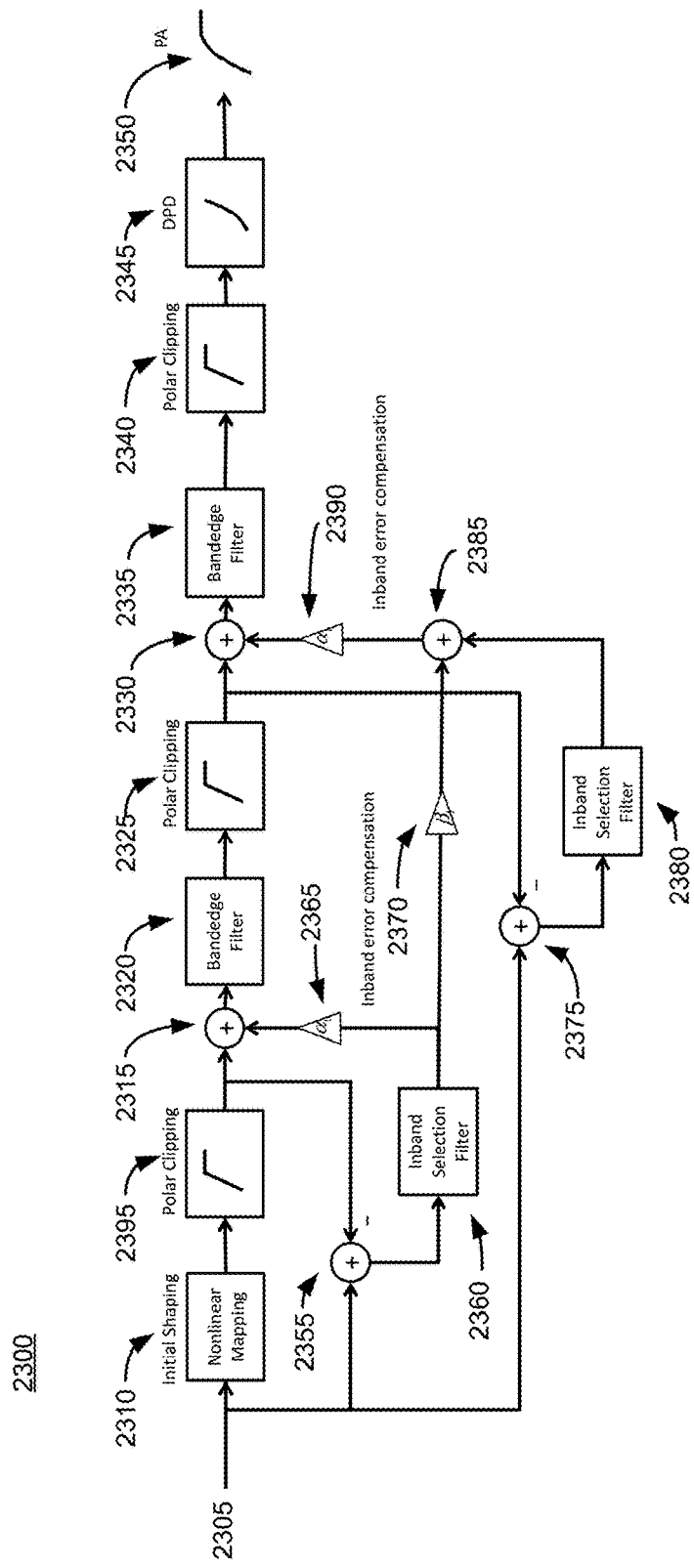
FIG. 23 is a block diagram of a two-iteration spectral shaper with convergence acceleration according to exemplary aspects of the present disclosure.

FIG. 23 is a block diagram of a two-iteration spectral shaper 2300 with convergence acceleration according to exemplary aspects of the present disclosure. Since the individual blocks forming the spectral shaper 2300 (i.e., nonlinear mapper, polar clipper, etc.) are substantially similar to the corresponding blocks described above with respect to other spectral shapers, they are not discussed further here for the sake of brevity.

In FIG. 23, a signal is received at the input 2305, initially shaped by the nonlinear mapper 2310, and clipped by the polar clipper 2395. After the polar clipper 2395, the signal is provide to the summing node 2355 where it is subtracted from the signal received at the input 2305. The output of the summing node 2355 is provided to an in-band filer 2360 for filtration after which it is provide to the summing node 2315 via a gain circuit 2365. The summing node 2395 adds the scaled output of the in-band filter 2360, which is scaled by the gain circuit 2365, to the output of the polar clipper 2395, and the result is provided to a band-edge filter 2320 for attenuation of emissions at the edge of the band. The output of the band-edge filter is clipped by the polar clipper 2325, and provided to the summing node 2375 where it is subtracted from the signal received at the input 2305. The output of the summing node 2375 is provided to the in-band filter 2380, the output of which is provided to a summing node 2385. The summing node 2385 also receives a scaled version of the output of the in-band filter 2360, which is scaled by the gain circuit 2370. The summing node 2385 adds these two signals together and provides the result, which is scaled by the gain circuit 2390, to the summing node 2330 where it is added to the output of the polar clipper 2325. The result is then filtered by a band-edge filter 2335, clipped by polar clipper 2340, and compensated by a DPD circuit 2345 before being provided to the power amplifier 2350.

As discussed above with reference to other spectral shapers, the spectral shaper 2300 may be implemented such that each block is an individual circuit on, for example, an ASIC, FPGA, or may be implemented on a general purpose processor, microcontroller, or digital signal processor. Also, certain blocks may be omitted from the spectral shaper 2300, such as one or more of the band-edge filters 2320, 2335. Other blocks may be substituted, such as another DPD circuit for the nonlinear mapper 2310. Numerous other variations are also possible as one of ordinary skill would recognize.

Figure 24:
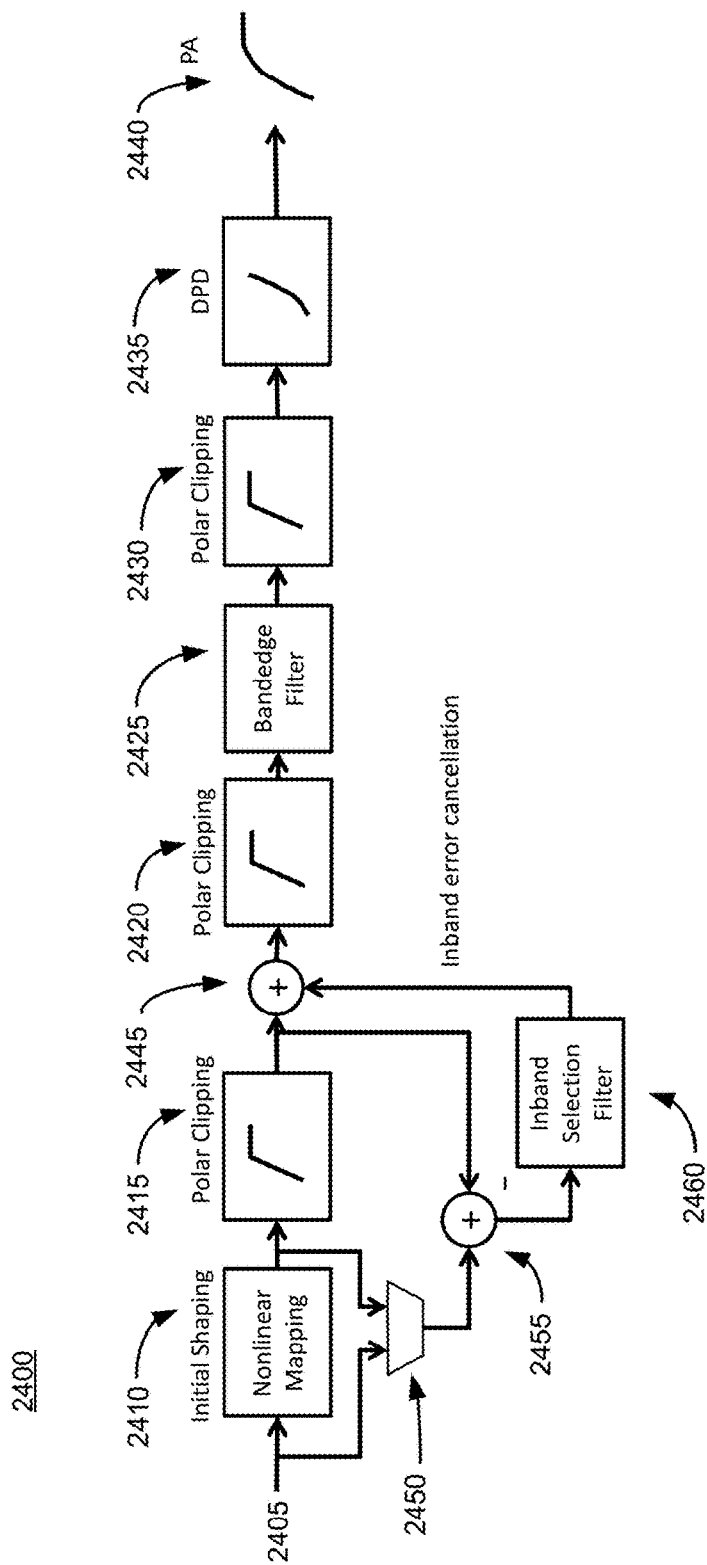
FIG. 24 is a block diagram of a single-iteration spectral shaper with further optimizations for signals that are received by receivers equipped with distortion recovery (DRR) convergence acceleration according to exemplary aspects of the present disclosure.

Another spectral shaper 2400 according to exemplary aspects of the present disclosure is described with reference to FIG. 24. The spectral shaper 2400 includes a multiplexer 2450 to select, based whether the received is a Distortion Recover Receiver (DRR) or not, whether the signal input at input 2405 or the output of the nonlinear mapper 2410 is provided to the summing node 2455. For DRRs, the output of the nonlinear mapper is selected by the multiplexer 2450. For all other cases the multiplexer selects the input 2405. Otherwise, the functionality of the spectral shaper 2400 is similar to that of the spectral shaper 900 between the input 2405 and the summing node 2445. Accordingly, further explanation of this section is omitted for brevity. Another difference between the spectral shaper 2400 and the spectral shaper 900 is that the output of the summing node 2445 is clipped by the polar clipper 2420, filtered by the band-edge filter 2425, clipped by the polar clipper 2430, and compensated by the DPD circuit 2435 before being provided to the power amplifier 2440.

As with the other spectral shapers, the spectral shaper 2400 may be implemented such that each block is an individual circuit on, for example, an ASIC, FPGA, or may be implemented on a general purpose processor, microcontroller, or digital signal processor. Also, certain blocks may be omitted from the spectral shaper 2400, such the band-edge filter 2430 and one or more of the polar clippers 2420, 2430. Other blocks may be substituted, such as another DPD circuit for the nonlinear mapper 2410. Numerous other variations are also possible as one of ordinary skill would recognize.

Figure 25:
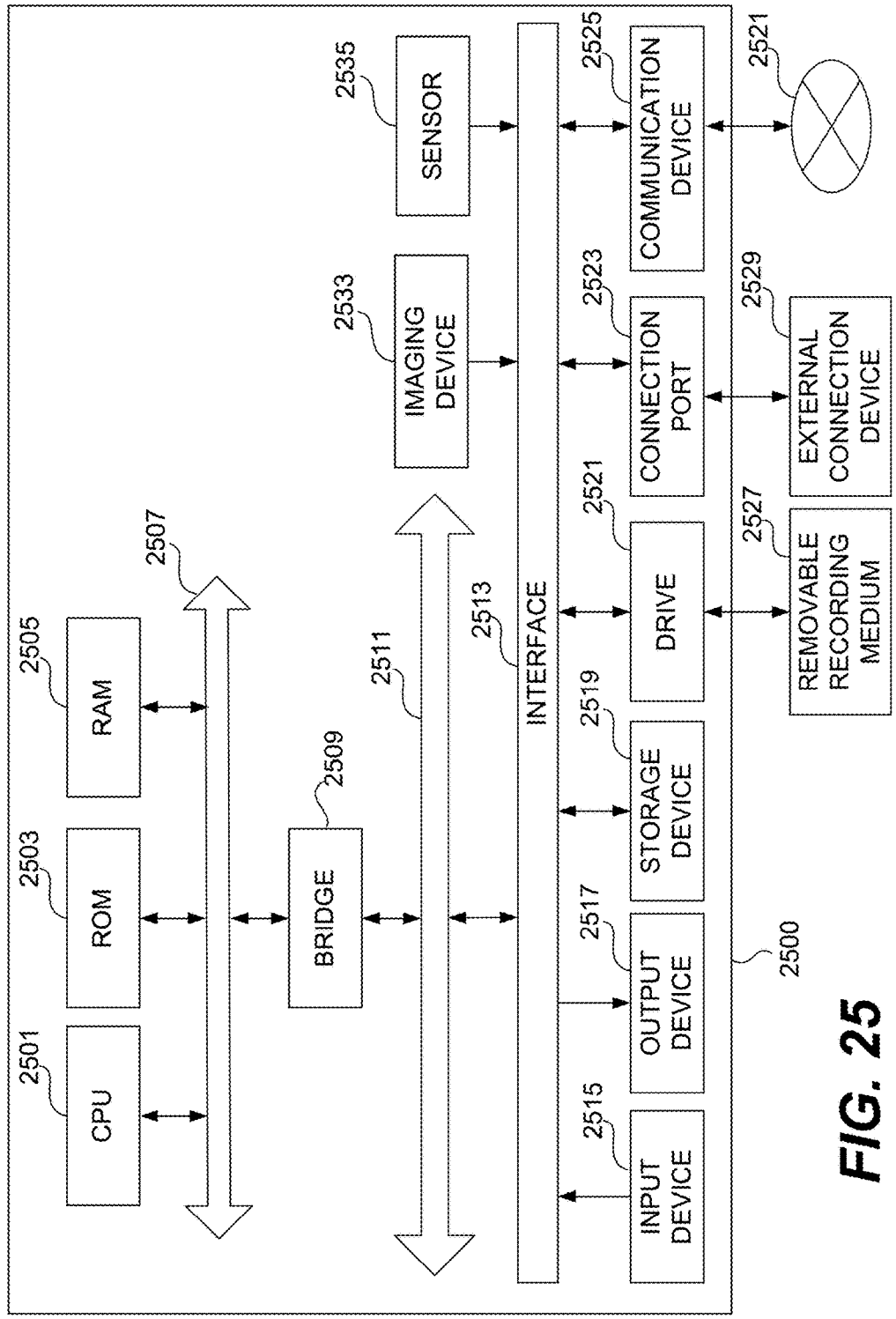
FIG. 25 is a block diagram of a device according to exemplary aspects of the present disclosure.

Next, a description of a device 2500 that may include one or more of the spectral shapers according to exemplary aspects of the present disclosure is described with reference to FIG. 25. This device 2500 may be any wireless communication device, such as a mobile phone, smart phone, personal digital assistant, wrist watch, tablet, personal computer, laptop computer, and the like. The device 2500 may also be an access point, base station, micro base station, femto base station, and the like. The device 2500 may even be embedded in other devices, such as in industrial controls, vehicles, etc. As such the descriptions with regard to FIG. 25 are merely exemplary, and other variations are possible without departing from the scope of the present disclosure.

The device 2500 includes a CPU 2501 which may be a general purpose processing circuit, microcontroller and the like. The CPU 2501 is connected to memory circuits, such as RAM 2505 and ROM 2503 via a bus 2507. As can be appreciated the bus 2507 may be a DMA bus, PCIe bus, USB, or any other communication bus that this known. The bus 2507 is connected to a second bus 2511 via a bridge circuit 2509. The bus 2511 connects to an interface circuit 2513 which interfaces with, for example, an imaging device 2533, sensors 2535 (accelerometers, light sensors, etc.), input devices 2515 (touch sensors, keys, microphone), output devices 2517 (display, speaker, etc.), storage devices 2519 (disk drives, memory sticks, SD memory cards, etc.), an internal drive 2521 (CD-ROM, for example) that accepts removable media 2527, a connection port 2523 (USB, lightning port, etc.) that connects to external devices 2529 or a charger, and communication devices 2525 to connect to a network 2521.

The communication device 2525 may communicate via wired networks, such as Ethernet, or wireless networks such as Wifi, cellular networks (4G, LTE, LTE-A), Bluetooth, etc. To this end the communication device 2525 may therefore, include one or more of the shapers described herein in order to meet requirements imposed for communication via one of the above-mentioned network protocols. The included spectral shapers may also compensate for any nonlinearity in one or more power amplifiers included in the communication device 2525.

Obviously, numerous modifications and variations of the present invention are possible in light of the above teachings. It is therefore to be understood that within the scope of the appended claims, the invention may be practiced otherwise than as specifically described herein.

The invention claimed is:

1. A spectral shaper device, comprising:
    circuitry comprising
        a first stage circuit that receives and processes a signal prior to providing a combined signal to be processed by a second stage circuit and then applied to a power amplifier as a spectrally shaped signal, the power amplifier having a non-linear amplification characteristic, the first stage circuit including
            a first path including
                a non-linear mapper circuit having a spectral characteristic determined from a first predetermined requirement on a spectral output of the power amplifier, the first path providing a first stage output signal that is combined with an in-band error cancellation signal,
                a first stage clipper circuit disposed downstream of the non-linear mapper circuit that provides a clipped output signal that is clipped at a first predetermined threshold, and
            a second path that is parallel to the first path and includes an in-band selection filter that performs a filter operation on a difference signal between the clipped output signal and at least one of the input signal and an output of the non-linear mapper circuit to provide the in-band error cancellation signal; and
        a second stage circuit that processes the combined signal prior to applying the spectrally shaped signal to the power amplifier, the second stage circuit including a second stage clipper circuit that clips the spectrally shaped signal at another threshold prior to being applied to the power amplifier, at least a portion of the spectral shape of the specially shaped signal being based on a second predetermined requirement, different from the first predetermined requirement, on the spectral output of the power amplifier.

2. The spectral shaper device according to claim 1, wherein the first stage clipper circuit clips an amplitude of an output of the non-linear mapper circuit and outputs the first stage output signal.

3. The spectral shaper device according to claim 2, wherein the first stage clipper circuit clips the amplitude of the signal after the non-linear mapper circuit shapes at least a portion of a spectrum of the signal received by the first stage circuit.

4. The spectral shaper according to claim 3, wherein the first stage clipper circuit uses polar clipping.

5. The spectral shaper according to claim 3, wherein the first stage clipper circuit clips the signal-at a saturation point of the power amplifier.

6. The spectral shaper device according to claim 1, wherein the second stage circuitry includes a band edge filter that filters emissions at band edges of the combined signal.

7. The spectral shaper device according to claim 6, wherein the band edge filter is disposed upstream of the second stage clipper circuit.

8. The spectral shaper device according to claim 1, wherein the first stage circuit includes another circuit that provides another in-band cancellation signal.

9. The spectral shaper device according to claim 1, wherein the nonlinear mapper circuit includes a look-up table.

10. The spectral shaper device according to claim 1, wherein the nonlinear mapper circuit implements a logarithmic function.

11. The spectral shaper device according to claim 1, wherein the first stage circuit and the second stage circuit are configured to adjust the spectrum of the signal to compensate for a nonlinearity in the power amplifier using an input/output characteristic that is an inverse of an input/output characteristic of the power amplifier.

12. The spectral shaper device according to claim 1, wherein the first stage circuit and the second stage circuit are configured to translate the signal from a time domain to a frequency domain using a fast Fourier transform (FFT), manipulate the frequency domain, and after manipulation, convert the signal from the frequency domain to the time domain using an inverse fast Fourier transform (IFFT).

13. The spectral shaper device according to claim 12, wherein the in-band selection filter includes a filter bank that includes a predetermined quarter-band filter kernel.

14. The spectral shaper device according to claim 13, wherein the filter bank includes a predetermined eighth-band filter kernel.

15. The spectral shaper device according to claim 1, wherein the spectral shaper device is included in a wireless transmitter.

16. The spectral shaper device according to claim 15, wherein the wireless transmitter is included in a portable communication device.

17. The spectral shaper device according to claim 15, wherein the wireless transmitter is included in an access point or a base station.

18. A spectral shaping method, comprising:
receiving and processing with a first stage circuit a signal prior to providing a combined signal to be processed by a second stage circuit and then applying a spectrally shaped output signal to a power amplifier, the power amplifier having a non-linear amplification characteristic,
in a first circuit path,
shaping, with a non-linear mapper circuit, a spectrum of a signal based on at least one predetermined requirement out-of-band requirement and at least one in-band requirement, and providing a first stage output signal that is combined with an in-band error cancellation signal,
clipping an output of the non-linear mapper circuit with a first stage clipper circuit disposed downstream of the non-linear mapper to provide a clipped output signal that is clipped at a first predetermined threshold, and
in a second path that is parallel to the first path applying an in-band selection filter on a difference signal between the clipped output signal and at least one of the signal that is input to the non-linear mapping circuit and a signal that is output of the non-linear mapper circuit to provide the in-band error cancellation signal; and
processing in a second stage circuit the combined signal prior to applying the spectrally shaped output signal to the power amplifier, the second stage circuit including a second stage clipper circuit that clips the spectrally shaped signal at another threshold prior to being applied to the power amplifier, at least a portion of the spectral shape of the specially shaped signal being based on a second predetermined requirement, different from the first predetermined requirement, on the spectral output of the power amplifier.

19. A non-transitory computer-readable medium storing computer readable instructions thereon that, when executed by processing circuitry, cause the processing circuitry to perform a spectral shaping method, comprising:
receiving and processing with a first stage circuit a signal prior to providing a combined signal to be processed by a second stage circuit and then applying a spectrally shaped output signal to a power amplifier, the power amplifier having a non-linear amplification characteristic,
in a first circuit path,
shaping, with a non-linear mapper circuit, a spectrum of a signal based on at least one predetermined requirement out-of-band requirement and at least one in-band requirement, and providing a first stage output signal that is combined with an in-band error cancellation signal,
clipping an output of the non-linear mapper circuit with a first stage clipper circuit disposed downstream of the non-linear mapper to provide a clipped output signal that is clipped at a first predetermined threshold, and
in a second path that is parallel to the first path applying in-band selection filter on a difference signal between the clipped output signal and at least one of the signal that is input to the non-linear mapping circuit and a signal that is output of the non-linear mapper circuit to provide the in-band error cancellation signal; and
processing in a second stage circuit the combined signal prior to applying the spectrally shaped output signal to the power amplifier, the second stage circuit including a second stage clipper circuit that clips the spectrally shaped signal at another threshold prior to being applied to the power amplifier, at least a portion of the spectral shape of the specially shaped signal being based on a second predetermined requirement, different from the first predetermined requirement, on the spectral output of the power amplifier.

\* \* \* \* \*